(12) United States Patent
Rosenflanz et al.

(10) Patent No.: US 8,056,370 B2
(45) Date of Patent: Nov. 15, 2011

(54) METHOD OF MAKING AMORPHOUS AND CERAMICS VIA MELT SPINNING

(75) Inventors: Anatoly Z. Rosenflanz, Maplewood, MN (US); Ahmet Celikkaya, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1443 days.

(21) Appl. No.: 10/211,684

(22) Filed: Aug. 2, 2002

(65) Prior Publication Data

US 2004/0020245 A1 Feb. 5, 2004

(51) Int. Cl.
*C03B 37/05* (2006.01)

(52) U.S. Cl. ............ 65/456; 65/469; 501/35; 501/41; 501/42; 501/43; 501/45; 501/46; 501/47; 501/48

(58) Field of Classification Search .......... 65/456, 65/469; 501/35, 41, 42, 43, 45, 46, 47, 48
See application file for complete search history.

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, III |
| 2,805,166 A | 9/1957 | Löffler |
| 2,958,593 A | 11/1960 | Hoover et al. |
| 2,961,296 A | 11/1960 | Fenerty |
| 3,041,156 A | 6/1962 | Rowse et al. |

(Continued)

FOREIGN PATENT DOCUMENTS

AT 333146 11/1976

(Continued)

OTHER PUBLICATIONS

Kingery et al, 1976 "Introduction to Ceramics", 2$^{nd}$ edition, John Wiley and Sons, pp. 95-109.*

(Continued)

*Primary Examiner* — John Hoffmann

(57) ABSTRACT

Methods of melt spinning to make amorphous and ceramic materials.

19 Claims, 2 Drawing Sheets

U.S. PATENT DOCUMENTS

| | | | |
|---|---|---|---|
| 3,141,747 A | 7/1964 | Marshall | |
| 3,174,871 A | 3/1965 | Geffcken et al. | |
| 3,181,939 A | 5/1965 | Marshall et al. | |
| 3,216,794 A | 11/1965 | Roschuk | |
| 3,377,660 A | 4/1968 | Marshall et al. | |
| 3,498,769 A | 3/1970 | Coes, Jr. | |
| 3,625,717 A | 12/1971 | Grubba et al. | |
| 3,635,739 A | 1/1972 | Macdowell et al. | |
| 3,637,361 A | 1/1972 | Kita et al. | |
| 3,646,713 A | 3/1972 | Marshall et al. | |
| 3,650,780 A | 3/1972 | Connelly | |
| 3,714,059 A | 1/1973 | Shaw et al. | |
| 3,717,583 A | 2/1973 | Shaw et al. | |
| 3,726,621 A | 4/1973 | Cichy | |
| 3,754,978 A | 8/1973 | Elmer et al. | |
| 3,781,172 A | 12/1973 | Pett et al. | |
| 3,792,553 A | 2/1974 | Schleifer et al. | |
| 3,859,407 A | 1/1975 | Blanding et al. | |
| 3,881,282 A | 5/1975 | Watson | |
| 3,891,408 A | 6/1975 | Rowse et al. | |
| 3,893,826 A | 7/1975 | Quinan et al. | |
| 3,916,584 A | 11/1975 | Howard et al. | |
| 3,926,603 A | 12/1975 | Plesslinger et al. | |
| 3,928,515 A | 12/1975 | Richmond et al. | |
| 3,940,276 A | 2/1976 | Wilson | |
| 3,947,281 A | 3/1976 | Bacon | |
| 3,973,977 A | 8/1976 | Wilson | |
| 3,996,702 A | 12/1976 | Leahy | |
| 4,014,122 A | 3/1977 | Woods | |
| 4,035,162 A | 7/1977 | Brothers et al. | |
| 4,049,397 A | 9/1977 | Bockstiegel et al. | |
| 4,059,417 A | 11/1977 | Ilmaier et al. | |
| 4,070,796 A | 1/1978 | Scott | |
| 4,073,096 A | 2/1978 | Ueltz et al. | |
| 4,111,668 A | 9/1978 | Walker et al. | |
| 4,111,707 A | 9/1978 | Komorita et al. | |
| 4,126,429 A | 11/1978 | Watson | |
| 4,140,494 A | 2/1979 | Coes, Jr. | |
| 4,157,898 A | 6/1979 | Walker et al. | |
| 4,182,437 A * | 1/1980 | Roberts et al. | 188/251 A |
| 4,194,887 A | 3/1980 | Ueltz et al. | |
| 4,217,264 A | 8/1980 | Mabie et al. | |
| 4,218,253 A | 8/1980 | Dworak et al. | |
| 4,238,213 A | 12/1980 | Pallo et al. | |
| 4,261,706 A | 4/1981 | Blanding et al. | |
| 4,311,489 A | 1/1982 | Kressner | |
| 4,314,827 A | 2/1982 | Leitheiser et al. | |
| 4,316,964 A | 2/1982 | Lange | |
| 4,341,533 A | 7/1982 | Daire et al. | |
| RE31,128 E | 1/1983 | Walker et al. | |
| 4,405,545 A | 9/1983 | Septier et al. | |
| 4,415,510 A | 11/1983 | Richmond | |
| 4,439,845 A | 3/1984 | Geohegan, Jr. et al. | |
| 4,457,767 A | 7/1984 | Poon et al. | |
| 4,467,767 A | 8/1984 | Kampichler et al. | |
| 4,472,511 A | 9/1984 | Mennemann et al. | |
| RE31,725 E | 11/1984 | Walker et al. | |
| 4,489,022 A | 12/1984 | Robyn et al. | |
| 4,518,397 A | 5/1985 | Leitheiser et al. | |
| 4,530,909 A | 7/1985 | Makishima et al. | |
| 4,543,107 A | 9/1985 | Rue | |
| 4,552,199 A * | 11/1985 | Onoyama et al. | 164/423 |
| 4,584,279 A | 4/1986 | Grabowski et al. | |
| 4,588,419 A | 5/1986 | Caul et al. | |
| 4,595,663 A | 6/1986 | Krohn et al. | |
| 4,623,364 A | 11/1986 | Cottringer et al. | |
| 4,652,275 A | 3/1987 | Bloecher et al. | |
| 4,705,656 A * | 11/1987 | Onoyama et al. | 75/333 |
| 4,734,104 A | 3/1988 | Broberg | |
| 4,737,163 A | 4/1988 | Larkey | |
| 4,741,743 A | 5/1988 | Narayanan et al. | |
| 4,744,802 A | 5/1988 | Schwabel | |
| 4,751,137 A | 6/1988 | Halg et al. | |
| 4,752,459 A | 6/1988 | Pepper | |
| 4,756,746 A | 7/1988 | Kemp, Jr. et al. | |
| 4,757,036 A | 7/1988 | Kaar et al. | |
| 4,762,677 A | 8/1988 | Dolgin | |
| 4,770,671 A | 9/1988 | Monroe et al. | |
| 4,772,511 A | 9/1988 | Wood et al. | |
| 4,780,268 A | 10/1988 | Papsi et al. | |
| 4,789,501 A | 12/1988 | Day et al. | |
| 4,799,939 A | 1/1989 | Bloecher et al. | |
| 4,800,685 A | 1/1989 | Haynes, Jr. | |
| 4,812,422 A | 3/1989 | Yuhaku et al. | |
| 4,829,031 A | 5/1989 | Roy et al. | |
| 4,881,951 A | 11/1989 | Wood et al. | |
| 4,898,587 A | 2/1990 | Mera | |
| 4,898,597 A | 2/1990 | Hay et al. | |
| 4,950,294 A | 8/1990 | Hakamatsuka | |
| 4,960,441 A | 10/1990 | Pellow et al. | |
| 4,997,461 A | 3/1991 | Markhof-Matheny et al. | |
| 5,007,943 A | 4/1991 | Kelly et al. | |
| 5,009,675 A | 4/1991 | Kunz et al. | |
| 5,009,676 A | 4/1991 | Rue et al. | |
| 5,011,508 A | 4/1991 | Wald et al. | |
| 5,013,696 A | 5/1991 | Greskovich et al. | |
| 5,023,212 A | 6/1991 | Dubots et al. | |
| 5,038,453 A | 8/1991 | Kurita et al. | |
| 5,042,991 A | 8/1991 | Kunz et al. | |
| 5,057,018 A | 10/1991 | Bowen | |
| 5,071,801 A | 12/1991 | Bedard et al. | |
| 5,085,671 A | 2/1992 | Martin et al. | |
| 5,090,968 A | 2/1992 | Pellow | |
| 5,094,672 A | 3/1992 | Giles, Jr. et al. | |
| 5,104,319 A | 4/1992 | Evans et al. | |
| 5,110,332 A | 5/1992 | Isaksson | |
| 5,118,326 A | 6/1992 | Lee et al. | |
| 5,122,176 A | 6/1992 | Goettler | |
| 5,131,926 A | 7/1992 | Rostoker et al. | |
| 5,139,978 A | 8/1992 | Wood | |
| 5,143,522 A | 9/1992 | Gibson et al. | |
| 5,152,917 A | 10/1992 | Pieper et al. | |
| 5,164,348 A | 11/1992 | Wood | |
| 5,185,299 A | 2/1993 | Wood et al. | |
| 5,194,072 A | 3/1993 | Rue et al. | |
| 5,201,916 A | 4/1993 | Berg et al. | |
| 5,203,884 A | 4/1993 | Buchanan et al. | |
| 5,203,886 A | 4/1993 | Sheldon et al. | |
| 5,213,591 A | 5/1993 | Celikkaya et al. | |
| 5,215,563 A * | 6/1993 | LaCourse et al. | 65/376 |
| 5,227,104 A | 7/1993 | Bauer | |
| 5,248,318 A | 9/1993 | Tamamaki et al. | |
| 5,259,147 A | 11/1993 | Falz et al. | |
| 5,273,566 A | 12/1993 | Balcar et al. | |
| 5,282,875 A | 2/1994 | Wood et al. | |
| 5,312,789 A | 5/1994 | Wood | |
| 5,336,280 A | 8/1994 | Dubots et al. | |
| 5,352,254 A | 10/1994 | Celikkaya | |
| 5,366,523 A | 11/1994 | Rowenhorst et al. | |
| 5,372,620 A | 12/1994 | Rowse et al. | |
| 5,376,470 A | 12/1994 | Sprouse | |
| 5,378,251 A | 1/1995 | Culler et al. | |
| 5,378,662 A | 1/1995 | Tsuyuki | |
| 5,395,407 A | 3/1995 | Cottringer et al. | |
| 5,413,974 A | 5/1995 | Yokoyama et al. | |
| 5,417,726 A | 5/1995 | Stout et al. | |
| 5,427,595 A | 6/1995 | Pihl et al. | |
| 5,429,647 A | 7/1995 | Larmie | |
| 5,431,704 A | 7/1995 | Tamamaki et al. | |
| 5,436,063 A | 7/1995 | Follett et al. | |
| 5,443,906 A | 8/1995 | Pihl et al. | |
| 5,449,389 A | 9/1995 | Yoshizumi et al. | |
| 5,484,752 A | 1/1996 | Waku et al. | |
| 5,496,386 A | 3/1996 | Broberg et al. | |
| 5,498,269 A | 3/1996 | Larmie | |
| 5,516,348 A | 5/1996 | Conwell et al. | |
| 5,520,711 A | 5/1996 | Helmin | |
| 5,534,843 A | 7/1996 | Tsunoda et al. | |
| 5,547,479 A | 8/1996 | Conwell et al. | |
| 5,549,962 A | 8/1996 | Holmes et al. | |
| 5,551,963 A | 9/1996 | Larmie | |
| 5,552,213 A * | 9/1996 | Eschner | 428/294.7 |
| 5,569,547 A | 10/1996 | Waku et al. | |
| 5,593,467 A | 1/1997 | Monroe | |
| 5,605,870 A | 2/1997 | Strom-Olsen et al. | |
| 5,609,706 A | 3/1997 | Benedict et al. | |
| 5,611,829 A | 3/1997 | Monroe et al. | |

| | | | | | | |
|---|---|---|---|---|---|---|
| 5,641,469 | A | 6/1997 | Garg et al. | EP | 0 494 638 | 7/1992 |
| 5,645,619 | A | 7/1997 | Erickson et al. | EP | 0 495 536 A2 | 7/1992 |
| 5,651,925 | A | 7/1997 | Ashley et al. | EP | 0 579 281 A1 | 1/1994 |
| 5,653,775 | A | 8/1997 | Plovnick et al. | EP | 0 601 453 A2 | 6/1994 |
| 5,665,127 | A | 9/1997 | Moltgen et al. | EP | 0 647 601 A1 | 4/1995 |
| 5,679,067 | A | 10/1997 | Johnson et al. | EP | 0 666 238 B1 | 8/1995 |
| 5,682,082 | A | 10/1997 | Wei et al. | EP | 0 666 239 B1 | 8/1995 |
| 5,693,239 | A | 12/1997 | Wang et al. | EP | 0 709 347 | 5/1996 |
| 5,721,188 | A | 2/1998 | Sung et al. | EP | 0 722 919 A1 | 7/1996 |
| 5,725,162 | A | 3/1998 | Garg et al. | EP | 0 291 029 B2 | 11/1996 |
| 5,733,178 | A | 3/1998 | Ohishi | FR | 1547989 | 10/1968 |
| 5,733,564 | A | 3/1998 | Lehtinen | FR | 2 118 026 | 7/1972 |
| 5,738,696 | A | 4/1998 | Wu | FR | 2 538 370 | 6/1984 |
| 5,747,397 | A | 5/1998 | McPherson et al. | FR | 2609708 | 7/1988 |
| 5,763,345 | A | 6/1998 | Ohshima et al. | GB | 793503 | 4/1958 |
| 5,782,940 | A | 7/1998 | Jayan et al. | GB | 1005338 | 9/1965 |
| 5,804,513 | A | 9/1998 | Sakatani et al. | GB | 1 121 875 | 7/1968 |
| 5,847,865 | A | 12/1998 | Gopinath et al. | GB | 1 260 933 A | 1/1972 |
| 5,856,254 | A | 1/1999 | Feige et al. | GB | 2 116 992 | 10/1983 |
| 5,863,308 | A | 1/1999 | Qi et al. | JP | 50-25608 | 3/1975 |
| 5,876,470 | A | 3/1999 | Abrahamson | JP | 59 22 7726 A | 12/1984 |
| 5,902,763 | A | 5/1999 | Waku et al. | JP | 61099665 | 5/1986 |
| 5,903,951 | A | 5/1999 | Ionta et al. | JP | 62-003041 | 1/1987 |
| 5,952,256 | A | 9/1999 | Morishita et al. | JP | 63-156024 | 6/1988 |
| 5,954,844 | A | 9/1999 | Law et al. | JP | 63-303821 | 12/1988 |
| 5,961,674 | A | 10/1999 | Gagliardi et al. | JP | HEI 4-119941 | 4/1992 |
| 5,975,988 | A | 11/1999 | Christianson | JP | 05-085821 | 4/1993 |
| 5,976,274 | A | 11/1999 | Inoue et al. | JP | 05-226733 | 9/1993 |
| 5,981,413 | A | 11/1999 | Hale | JP | 06 040765 A | 2/1994 |
| 5,981,415 | A | 11/1999 | Waku et al. | JP | 06-171974 | 6/1994 |
| 6,053,956 | A | 4/2000 | Wood | JP | 3113428 A | 5/1999 |
| 6,054,093 | A | 4/2000 | Torre, Jr. et al. | JP | HEI 11-189926 | 7/1999 |
| 6,123,743 | A | 9/2000 | Carman et al. | JP | 200045128 A | 2/2000 |
| 6,128,430 | A | 10/2000 | Chu et al. | JP | 200045129 A | 2/2000 |
| 6,146,244 | A | 11/2000 | Atsugi et al. | JP | 2001294480 | 10/2001 |
| 6,214,429 | B1 | 4/2001 | Zou et al. | KR | 9601009 B1 | 1/1996 |
| 6,245,700 | B1 | 6/2001 | Budd et al. | RU | 1455569 | 10/1996 |
| 6,251,813 | B1 | 6/2001 | Sato | SU | 1455569 | 10/1986 |
| 6,254,981 | B1 | 7/2001 | Castle | WO | WO 94/14722 | 7/1994 |
| 6,268,303 | B1 | 7/2001 | Aitken et al. | WO | WO 97/16385 | 5/1997 |
| 6,277,161 | B1 | 8/2001 | Castro et al. | WO | WO 97/25284 | 7/1997 |
| 6,287,353 | B1 | 9/2001 | Celikkaya | WO | WO 00/34201 | 6/2000 |
| 6,306,926 | B1 | 10/2001 | Bretscher et al. | WO | WO 01/16047 A2 | 3/2001 |
| 6,335,083 | B1 | 1/2002 | Kasai et al. | WO | WO 01/23321 A1 | 4/2001 |
| 6,361,414 | B1 | 3/2002 | Ravkin et al. | WO | WO 01/23323 A1 | 4/2001 |
| 6,362,119 | B1 | 3/2002 | Chiba | WO | WO 01/27046 A1 | 4/2001 |
| 6,451,077 | B1 | 9/2002 | Rosenflanz | WO | WO 01/56946 A | 8/2001 |
| 6,454,822 | B1 | 9/2002 | Rosenflanz | WO | WO 01/56947 A | 8/2001 |
| 8,447,937 | | 9/2002 | Murakawa et al. | WO | WO 01/56949 A | 8/2001 |
| 6,458,731 | B1 | 10/2002 | Rosenflanz | WO | WO 01/56950 A | 8/2001 |
| 6,461,988 | B2 | 10/2002 | Budd et al. | WO | WO 02/08146 A | 1/2002 |
| 6,469,825 | B1 | 10/2002 | Digonnet et al. | WO | WO 03/011776 A1 | 2/2003 |
| 6,482,758 | B1 | 11/2002 | Weber et al. | | | |
| 6,482,761 | B1 | 11/2002 | Watanabe et al. | | | |
| 6,484,539 | B1 | 11/2002 | Nordine et al. | | | |
| 6,490,081 | B1 | 12/2002 | Feillens et al. | | | |
| 6,511,739 | B2 | 1/2003 | Kasai et al. | | | |
| 6,514,892 | B1 | 2/2003 | Kasai et al. | | | |
| 6,521,004 | B1 | 2/2003 | Culler et al. | | | |
| 6,620,214 | B2 | 9/2003 | McArdle et al. | | | |
| 6,749,653 | B2 | 6/2004 | Castro et al. | | | |
| 2001/0030811 | A1 | 10/2001 | Kasai et al. | | | |
| 2002/0066233 | A1 | 6/2002 | McArdle et al. | | | |
| 2002/0160694 | A1 | 10/2002 | Wood et al. | | | |
| 2003/0040423 | A1 | 2/2003 | Harada et al. | | | |
| 2004/0148868 | A1 | 8/2004 | Anderson et al. | | | |
| 2005/0075233 | A1 | 4/2005 | Weber et al. | | | |

FOREIGN PATENT DOCUMENTS

| | | |
|---|---|---|
| DE | 20 34 011 | 7/1970 |
| DE | 134 638 A | 3/1979 |
| DE | 141 420 | 4/1980 |
| EP | 0 200 487 | 11/1986 |
| EP | 0 227 374 | 7/1987 |
| EP | 0 236 507 | 9/1987 |
| EP | 0 291 029 A1 | 11/1988 |
| EP | 0 408 771 A1 | 1/1991 |
| EP | 0 469 271 | 2/1992 |
| EP | 0 480 678 A1 | 4/1992 |

OTHER PUBLICATIONS

Merriam Webster's Collegiate Dictionary (1997) 10$^{th}$ ed. Merriam-Webster Inc. p. 34.*

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects on Hold", Industrial Minerals, Aug. 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6-7.

"Rare Earths Prices Recover Despite China's Overcapacity", Louise Rodriquez, America Metal Market, vol. 109, No. 14, Jan. 22, 2001, p. 13.

"China Rare Earth Information", China Rare Earth Information Center, vol. 6, No. 4, Aug. 2000, 3 pages.

"Microstructure and Thermal Stability of $Al_2O_3/Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.

"Divorced Eutectic and Interface Characteristics in a Solidified YAG-Spinel Composite With Spinel-Rich Composition", S. Wang et al., J. Mat. Sci., 35, 2000, pp. 2757-2761.

"Processing, Microstructure, and Strength of Alumina-YAG Eutectic Polycrystals", Tai-I1 Mah et al., J. Am. Ceram. Soc., 83, [8], 2000, pp. 2088-2090.

"Phase Identification of $Al_2O_3/RE_3Al_5O_{12}$ and $Al_2O_3/REAlO_3$ (Re=Sm—Lu, Y) Eutectics", J. Crystal Growth, 218, 2000, pp. 67-73.

"Crystallization and Thermal Properties of $Al_2O_3$—$Y_2O_3$ Melts", S. V. Stankus et al., J. Crystal Growth, 167, 1996, pp. 165-170.

Dialog © file 319: Chem Bus NewsBase © 2001 Royal Soc Chemistry. Abstract for "China: Oversupply Puts Rare Earths Projects on Hold", Industrial Minerals n 359, p. 10.

"Rare-Earth Metals", J. Hedrick, pp. 61.1-61.6, 1997.

"Rare-Earth Metal Prices in the USA ca. 1960 to 1994", J. Hedrick, J. Alloys and Compounds, 1997, pp. 471-481.

"Preliminary data on subsolidus phase equilibria in the $La_2O_3$—$Al_2O_3$—$Mn_2O_3$ and $La_2O_3$—$Al_2O_3$—$Fe_2O_3$ systems", Hrovat et al., *Journal of Materials Science Letters*, vol. 14, 1995, pp. 265-267.

"Aspects of Synthesis of Decorite Opacified Glass", Keramika, *Glass and Ceramics*, vol. 58, Nos. 1-2, pp. 8-11, Jan. 2001.

"A New Ceramic Eutectic Composite with High Strength at 1873 K", Yoshiharu Waku, *Advanced Materials*, vol. 10, No. 8, 1998, pp. 615-617.

"Synthesis of Y—Al Garnet", Krokhin et al., *Glass and Ceramics*, vol. 55, Nos. 5-6, 1998, pp. 151-152.

"High-temperature strength and thermal stability of a unidirectionally solidified $Al_2O_3$/YAG eutectic composite", Waku et al., pp. 1217-1225.

"Sapphire matrix composites reinforced with single crystal VAG phases", Waku et al., *Journal of Materials Science*, vol. 31, 1996, pp. 4663-4670.

"Thermo-Mechanical Stability of Directionally Solidified $Al_2O_3$—$ZrO_2(Y_2O_3)$ Eutectic Fibers", Yang and Zhu, *Scripta Materialia*, vol. 36, No. 8, 1997, pp. 961-965.

"A ductile ceramic eutectic composite with high strength at 1,873 K", Waku et al., *Nature*, vol. 389, Sep. 1997, pp. 49-52.

"The Liquidus Surface in the $Al_2O_3$—$ZrO_2$—$Y_2O_3$ Phase Diagram", Lakiza et al., *Powder Metallurgy and Metal Ceramics*, vol. 33, No. 11-12, 1994, pp. 595-597.

"Powder-Material Research Methods and Properties Polythermal Sections of the $Al_2O_3$—$ZrO_2$—$Y_2O_3$ Phase Diagram", Lakiza et al., *Powder Metallurgy and Metal Ceramics*, vol. 34, No. 11-12, 1995, pp. 655-659.

"Metastable Phase Relationships in the System $Al_2O_3$—$ZrO_2$—$Y_2O_3$", Lakiz and Lopato, *Powder Metallurgy and Metal Ceramics*, vol. 35, Nos. 11-12, 1996, pp. 621-626.

"Solidus Surface and Phase Equilibria During the Solidification of Alloys in the $Al_2O_3$—$ZrO_2$—$Y_2O_3$ System", Lakiza et al., *Powder Metallurgy and Metal Ceramics*, vol. 34, Nos. 1-2, 1995, pp. 64-67.

"Methods of Investigation of Properties of Powder Materials, Interactions in the $Al_2O_3$—$ZrO_2$—$Y_2O_3$ System", Lakiza et al., *Powder Metallurgy and Metal Ceramics*, vol. 33, Nos. 9-10, 1994, pp. 486-490.

"Rapid Solidification of Ceramics a Technology Assessment", Brockway et al. *Metals and Ceramics Information Center*, MCIC Report, Jan. 1984 MCIC 84-49.

Figs. 311, 346, 350, 354-56, 373, and 716, *Phase Diagrams for Ceramists*, The American Ceramic Society, 1964, pp. 122, 136, 138, 140, 144, 248.

Figs. 2340-44, 2363, 2370, 2374-75, 2382-83, 2385, 2387, 2390, and 2392, *Phase Diagrams for Ceramists, 1969 Supplement*, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, *Phase Diagrams for Ceramists, 1975 Supplement*, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, *Phase Diagrams for Ceramists, vol. IV*, The American Ceramic Society, 1981, pp. 29, 125, 127, 129-131, 133, 135-137, 139, 141, 143, 220, 228.

Fig. 6464, *Phase Diagrams for Ceramists, vol. VI*, The American Ceramic Society, 1981, p. 162.

Figs. 9262, and 9264, *Phase Diagrams for Ceramists, vol. XI, Oxides*, The American Ceramic Society, 1995, pp. 105-106.

"Phase Equilibria in the Yttrium Oxide-Alumina System", Toropov et al., *Bulletin of the Academy of Sciences, USSR*, Division of Chemical Science, No. 7, Jul. 1964, pp. 1076-1081, A translation of *Seriya Khimicheskaya*.

McKittrick, Joanna, et al., "Non-stoichiometry and defect structures in rapidly solidified MgO—$Al_2O_3$—$ZrO_2$ ternary eutectics," *Materials Science and Engineering* A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83 [8], 2000, 1868-1872.

Aguilar, E.A., "Processing and crystallization of rapidly solidified $Al_2O_3$—$Y_2O_3$ fibres", British Ceramic Transactions, 2000, vol. 99, No. 6, pp. 256-259.

U.S. Patent Application entitled "Fused $Al_2O_3$—$Y_2O_3$ Eutectic Abrasive Particles, Abrasive Articles, and Methods of Making and Using the Same", filed Jul. 19, 2000, Rosenflanz et al. having U.S. Appl. No. 09/620,262.

U.S. Patent Application entitled "Fused-$Al_2O_3$—MgO—$Y_2O_3$ Eutectic Abrasive Particles, Abrasive Articles, and Methods of Making and Using the Same", filed Nov. 2, 2000, Rosenflanz having U.S. Appl. No. 09/704,843.

U.S. Patent Application entitled "Fused $Al_2O_3$ Rare Earth Oxide Eutectic Abrasive Particles, Abrasive Articles, and Methods of Making and Using the Same", filed Jul. 19, 2000, Rosenflanz et al. having U.S. Appl. No. 09/618,879.

U.S. Patent Application entitled "Fused Abrasive Particles, Abrasive Articles, and Methods of Making and Using the Same", filed Jul. 19, 2000, Rosenflanz et al. having U.S. Appl. No. 09/619,191.

U.S. Patent Application entitled "Fused Aluminum Oxycarbide/Nitride-$Al_2O_3$ Rare Earth Oxide Eutectic Abrasive Particles, Abrasive Articles, and Methods of Making and Using the Same", filed Jul. 19, 2000, Rosenflanz having U.S. Appl. No. 09/619,289.

U.S. Patent Application entitled "Fused Aluminum Oxycarbide/Nitride-$Al_2O_3$ Rare Earth Oxide Eutectic Materials", filed Jul. 19, 2000, Rosenflanz having U.S. Appl. No. 09/619,106.

U.S. Patent Application entitled "Fused $Al_2O_3$—$Y_2O_3$—$ZrO_2$ Eutectic Abrasive Particles, Abrasive Articles, and Methods of Making and Using the Same", filed Jul. 19, 2000, Rosenflanz having U.S. Appl. No. 09/618,876.

U.S. Patent Application entitled "Fused $Al_2O_3$-Rare Earth Oxide-$ZrO_2$ Eutectic Materials", filed Jul. 19, 2000, Rosenflanz having U.S. Appl. No. 09/619,192.

U.S. Patent Application entitled "Fused $Al_2O_3$-Rare Earth Oxide-$ZrO_2$ Eutectic Abrasive Particles, Abrasive Articles, and Methods of Making and Using the Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutectic Materials", filed Jan. 30, 2001, Rosenflanz having U.S. Appl. No. 09/772,730.

U.S. Patent Application entitled "$Al_2O_3$-Rare Earth Oxide-$ZrO_2$/$HfO_2$ Materials, and Methods of Making and Using the Same", filed Aug. 2, 2002, Rosenflanz having U.S. Appl. No. 10/211,597.

U.S. Patent Application entitled "$Al_2O_3$—$Y_2O_3$—$ZrO_2$/$HfO_2$ Materials, and Methods of Making and Using the Same", filed Aug. 2, 2002, Rosenflanz having U.S. Appl. No. 10/211,638.

U.S. Patent Application entitled, "Abrasive Particles, and Methods of Making and Using the Same", filed Aug. 2, 2002, Rosenflanz having U.S. Appl. No. 10/211,629.

U.S. Patent Application entitled, "Abrasive Particles, Abrasive Articles, and Methods of Making and Using the Same", filed Aug. 2, 2002, Rosenflanz et al. having U.S. Appl. No. 10/211,598.

U.S. Patent Application entitled, "Abrasive Particles, and Methods of Making and Using the Same", filed Aug. 2, 2002, Rosenflanz et al. having U.S. Appl. No. 10/211,630.

U.S. Patent Application entitled, "Method for Making Amorphous Materials and Ceramics", filed Aug. 2, 2002, Rosenflanz et al. having U.S. Appl. No. 10/211,639.

U.S. Patent Application entitled, "Ceramic Materials, Abrasive Particles, Abrasive Articles, and Methods of Making and Using the Same", filed Aug. 2, 2002, Rosenflanz having U.S. Appl. No. 10/211,034.

U.S. Patent Application entitled, "Glass-Ceramics", filed Aug. 2, 2002, Rosenflanz having U.S. Appl. No. 10/211,044.

U.S. Patent Application entitled, "Alunmina-Zirconia, and Methods of Making and Using the Same", filed Aug. 2, 2002, Rosenflanz et al. having U.S. Appl. No. 10/211,620.

U.S. Patent Application entitled, "Method of Making Ceramic Articles", filed Aug. 2, 2002, Rosenflanz having U.S. Appl. No. 10/211,481.

U.S. Patent Application entitled "Plasma Spraying", filed Aug. 2, 2002, Rosenflanz et al. having U.S. Appl. No. 10/211,640.

U.S. Appl. No. 10/358,772, filed Feb. 5, 2003, Methods of Making Ceramic Particles.

U.S. Appl. No. 10/358,765, filed Feb. 5, 2003, Methods of Making Ceramics.

U.S. Appl. No. 10/358,910, filed Feb. 5, 2003, Ceramics and Methods of Making the Same.

U.S. Appl. No. 10/358,855, filed Feb. 5, 2003, $Al_2O_3$—$La_2O_3$—$Y_2O_3$—MgO Ceramics, and Methods of Making the Same.

U.S. Appl. No. 10/358,708, filed Feb. 5, 2003, Methods of Making $Al_2O_3$—$SiO_2$ Ceramics.

"$Gd_3Al_5O_{12}$ Phase Obtained by Crystallization of Amorphous $Gd_2O_3$ ⅝ $Al_2O_3$," Shishido et al., *Journal of the American Ceramic Society*, vol. 61, No. 7-8, Jul.-Aug. 1978, pp. 373-374.

"Rapid Quenching on the Binary Systems of High Temperature Oxides," Suzuki et al., *Mat. Res. Bull.*, vol. 9, 1974, pp. 745-754.

"Unusual Glass Formation in the Al-Nd—O System," Yajima et al., Chemistry Letters (published by the Chemical Society of Japan), 1973, pp. 741-742.

Glass Formation in the Ln—Al—O System, (Ln: Lanthanoid and Yttrium Elements), Yajima et al., Chemistry Letters, 1973, pp. 1327-1330.

"Production and Studies of Alumina Based Refractory Glass," Coutures et al., *Mat. Res. Bull.*, vol. 10, No. 6, 1975, pp. 539-546.

"Net Optical Gain At 1.53 μm in Er-Doped $Al_2O_3$ Waveguides on Silicon," van den Hoven et al., Appl. Phys. Lett. 68 (14), Apr. 1, 1966, pp. 1886-1888.

"Durable 3-5 μm Transmitting Infrared Window Materials," Harris et al., Infared Physics & Technology 39, 1998, pp. 185-201.

"Erbium-Doped Phosphate Glass Waveguide on Silicon With 4.1 dB/cm Gain At 1.535 μm," Yan et al., Appl. Phys. Lett, 71 (20), Nov. 17, 1997.

Kondrashov V I et al., "Opacified Glass "Decorit" Synthesis Directions", Steklo I Keramika 2001, No. 1, pp. 8-11.

Imakoa, Monoru et al., "Refractive Index and Abbe's Number of Glass of Lanthanum Borate System", Journal Ceramic Assoc. Japan, vol. 70, No. 5, (1962), pp. 115.

Jantzen, C.M., Krepski, R.P., & Herman, H., "Ultra-Rapid Quenching of Laser-Method Binary and Unary Oxides", *Mat. Res. Bull.* 15, 1313-1326 (1980).

Khor K.A., "Novel ZrO2-Mullite Composites Produced by Plasma Spraying", Proceedings of the 15th International Thermal Pray Conference, May 25-29, 1998, Nice, France.

Kingery, W.D., Introduction to Ceramics, Second Edition, Chpt. III subchapter 8.8, Glass-Ceramic Materials, pp. 368-374, (1976).

Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970) 125-134.

McMillan, P.W., *Glass-Ceramics*, Academic Press, Inc., 2nd Edition (1979).

Ray, C.S. and Day, D.E., "Determining the Nucleation Rate Curve for Lithium Disilicate Glass by Differential Thermal Analysis", J. Am. Ceram. Soc. 73(2) 439-442 (1990).

Schmucker, M, et al., "Constitution of Mullite Glasses Produced by Ultra-Rapid Quenching of Plasma-Sprayed Melts", Journal of the European Ceramic Society 15 (1995) 1201-1205.

Sarjeant, P.T. & Roy, R., in *Reactivity of Solids* (ed. J. W. Mitchell, R.C., DeVries, R.W., Roberts and P. Cannon) 725-33 (John Wiley & Sons, Inc., New York 1969).

Stookey. S. D., Ceramics Made by Nucleation of Glass-Comparison of Microstructure and Properties with Sintered Ceramics, The American Ceramic Society, (1992), pp. 1-4.

Takamori, T., & Roy, R., "Rapid Crystallization of $SiO_2$—$Al_2O_3$ Glasses", Journal of American Society, vol. 56, No. 12, Dec. 1973.

Varshneya, Arun K., "Fundamentsal of Inorganic Glasses", pp. 425-427 (1994).

Weber et al., "Synthesis and Optical Properties of Rare-Earth-Aluminum Oxide glasses", J. Am. Ceram. Soc. 85(5) 1309-1311 (2002).

Wilding, M.C., McMillan, P.F., "Polyamorphic Transitions in Yttria-Alumina Liquids", *J. Non-Cryst. Solids*. 293-295, 357-365 (2001).

"Rare Earth Oxide-Aluminum Oxide Glasses for Mid-Range IR Devices," Weber et al., reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

Device Materials Based on Er-, Ho-, Tm-, and Yb-Doped Rare Earth Aluminum Oxide (REAl™) Glass, Weber et al., reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).

U.S. Application entitled "Agglomerate Abrasive Grain and a Method of Making the Same", filed Feb. 11, 2004, having U.S. Appl. No. 10/776,156.

U.S. Application entitled "Methods of Making Ceramic Particles", filed Sep. 5, 2003, having U.S. Appl. No. 10/655,729.

U.S. Application entitled "Methods of Making Ceramics Comprising $Al_2O_3$, REO, $ZrO_2$ and/or $HfO_2$, and $Nb_2O_5$ and/or $Ta_2O_5$", filed Sep. 18, 2003, having U.S. Appl. No. 10/666,615.

U.S. Application entitled "Ceramics Comprising $Al_2O_3$, REO, $ZrO_2$ and/or $HfO_2$, and $Nb_2O_5$ and/or $Ta_2O_5$, and Methods of Making the Same", filed Sep. 18, 2003, having U.S. Appl. No. 10/666,212.

U.S. Application entitled "Ceramics Comprising $Al_2O_3$, $Y_2O_3$, $ZrO_2$ and/or $HfO_2$, and $Nb_2O_5$ and/or $Ta_2O_5$, and Methods of Making the Same", filed Sep. 18, 2003, having U.S. Appl. No. 10/666,098.

U.S. Application entitled "Alumina-Yttria Particles and Methods of Making the Same", filed Dec. 18, 2003, having U.S. Appl. No. 10/740,262.

U.S. Application entitled "Method of Making Abrasive Particles", filed Dec. 18, 2003, having U.S. Appl. No. 10/739,420.

U.S. Application entitled "Method of Making Abrasive Particles," filed Dec. 18, 2003, having U.S. Appl. No. 10/739,624.

U.S. Application entitled "Transparent Fused Crystalline Ceramics, and Method of Making the Same", filed Dec. 18, 2003, having U.S. Appl. No. 10/739,439.

U.S. Application entitled "Method of Making Abrasive Particles", filed Dec. 18, 2003, having U.S. Appl. No. 10/739,440.

U.S. Application entitled "Method of Making Abrasive Particles", filed Dec. 18, 2003, having U.S. Appl. No. 10/740,096.

U.S. Application entitled "Method of Making Abrasive Particles", filed Dec. 18, 2003, having U.S. Appl. No. 10/739,441.

U.S. Application entitled "Powder Feeding Method and Apparatus", filed Dec. 18, 2003, having U.S. Appl. No. 10/739,233.

U.S. Application entitled "Use of Ceramics in Dental and Orthodontic Applications", filed Feb. 5, 2003, having U.S. Appl. No. 10/358,856.

U.S. Application entitled "Use of Glasses Containing Rare Earth Oxide, Alumina, and Zirconia and Dopant in Optical Waveguides", filed Apr. 28, 2003, having U.S. Appl. No. 10/425,039.

Aasland and McMillan, Nature 369, 633 (1994).

Aguilar et al, "Melt Extraction Processing of Structural $Y_2O_3$—$Al_2O_3$ Fibers", J. Eur. Ceram. Soc. 20 1091-1098 (2000).

Gandhi, A.S. and Jarayam, V., "Pressure Consolidation of Amorphous $ZrO_2$—$Al_2O_3$ by Plastic Deformation of Powder Particles", Acta Materiala, 50 (2002), 2137-2149.

Gonzalez, Eduardo J., et al., "High Pressure Compaction and Sintering of Nano-Size γ-$Al_2O_3$ Powder", *Materials and Manufacturing Processes* vol. 11, No. 6, 951-967, 1996.

"Eutectic Precipitation of the Spinel Solid Solution—Yttrium Aluminum Garnet (YAG) System," Shuqiang Wang et al., *Journal of the American Ceramic Society*, 1998, vol. 81, No. 1, pp. 263-265.

"Microstructures of laser-treated $Al_2O_3$—$ZrO_2$—$CeO_2$ composites," Zan-Hwey Chen et al., *Materials Science & Engineering A (Structural Materials: Properties, Microstructure and Processing)*, 1995, vol. A196, No. 1-2, pp. 253-260.

"Advances in the Grinding Efficiency of Sintered Alumina Abrasives," Andreas Krell et al., *Journal of the American Ceramic Society*, 1996, vol. 79, No. 3, pp. 763-769.

"Interface modification for increased fracture toughness in reaction-formed yttrium aluminum garnet/alumina eutectic composites," Luke N. Brewer et al., 1999, vol. 14, No. 10, pp. 3907-3912.

Dow Jones Interactive Internet Printout on Jun. 20, 2001 for web address "http://ptg.djnr.com/ccroot/asp/publib/story.asp"; "China's Rare Earth Industry in the Doldrums", Asia Pulse, Jan. 28, 1999, 2 pages.

Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp": "Rare Earths: An Industry Review and Market Outlook—Part 1", Chemical Business NewsBase, Dec. 8, 2000, 2 pages.

U.S. Application entitled "Ceramics, and Methods of Making and Using the Same", filed Jul. 29, 2004.

U.S. Application entitled "Method of Making Ceramic Articles", filed Jul. 29, 2004.

* cited by examiner

METHOD OF MAKING AMORPHOUS AND CERAMICS VIA MELT SPINNING

The Government has rights in this invention pursuant to AL-WFO-2002-01.

FIELD OF THE INVENTION

The present invention relates methods of melt spinning to make amorphous and ceramic materials.

DESCRIPTION OF RELATED ART

The use of melt spinning to make amorphous and ceramic materials is known in the art. In general, melt-spinning involves forcing a melt through an orifice (e.g., by the application of gas or mechanical pressure) and then contacting the melt with a moving substrate (e.g., a rotating wheel, commonly a chilled wheel) such that the melt rapidly cools to provide a solid elongated shape (e.g., ribbon or fiber). The shape of the solid elongated shape may depend, for example, on factors such as the viscosity of the melt, surface tension, wetting characteristics, heat transfer rate between the melt and the substrate, capillary and mechanical forces. Furthermore, the shape of the (cooling) substrate at the contact point tends to play a role in determining the shape and the thickness of the solidified material. Forms of solidified materials that have been made include wires, filaments, thin, thick, wide, multi-layered films and sheets.

Although a large number of metal oxides have been obtained in an amorphous (including glass) state by melting and rapidly quenching, most, because of the need for very high quench rates to provide amorphous material, rather than crystalline material, can not be formed into bulk or complex shapes. Generally, such systems are very unstable against crystallization during subsequent reheating and therefore tend not to exhibit properties such as viscous flow. On the other hand, glasses based on the known network forming oxides (e.g., silica and boria) are generally relatively stable against crystallization during reheating and, hence tend to have a "working" range where viscous flow occurs Formation of large articles made of known glass (e.g., silica and boria) via viscous sintering at temperatures above glass transition temperature is well known. For example, in the abrasive industry, grinding wheels are made using vitrified bond to secure abrasive grains together.

Although there are a number of compositions known to be useful for making amorphous materials, there is a continuing desire for new materials made by melt spinning.

SUMMARY OF THE INVENTION

In one aspect, the present invention provides a method for making ceramic comprising glass, the method comprising contacting a melt with a surface of a rotating substrate such that the melt cools to provide a ceramic comprising glass, the melt comprising at least 35 (in some embodiments, preferably at least 40, 45, 50, 55, 60, 65, or even at least 70) percent by weight $Al_2O_3$, based on the total weight of the melt, a first metal oxide other than $Al_2O_3$, and a second, different metal oxide other than $Al_2O_3$ (e.g., $Y_2O_3$, REO, MgO, $TiO_2$, $Cr_2O_3$, CuO, NiO, $Fe_2O_3$, and complex metal oxides thereof), wherein the melt contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the melt; and the ceramic comprising glass, the glass comprising at least 35 (in some embodiments, preferably at least 40, 45, 50, 55, 60, 65, or even at least 70) percent by weight $Al_2O_3$, based on the total weight of the glass, the first metal oxide other than $Al_2O_3$, and the second, different metal oxide other than $Al_2O_3$, wherein the glass contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the glass. In some embodiments, the ceramic comprising glass is a fiber. In some embodiments, the fibers are substantially continuous (i.e., have a length to diameter of at least 1000:1). In some embodiments, a plurality the shapes (including particles, whiskers, discontinuous fibers, and ribbons (i.e., a planar, elongated shape)) is provided.

For example, in some embodiments, this method comprises contacting a melt with a surface of a rotating substrate such that the melt cools to provide a plurality of fibers comprising glass, the melt comprising at least 35 (in some embodiments, preferably at least 40, 45, 50, 55, 60, 65, or even at least 70) percent by weight $Al_2O_3$, based on the total weight of the melt, and a first metal oxide other than $Al_2O_3$ and a second, different metal oxide other than $Al_2O_3$ (e.g., $Y_2O_3$, REO, MgO, $TiO_2$, $Cr_2O_3$, CuO, NiO, $Fe_2O_3$, and complex metal oxides thereof), wherein the melt contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the melt; and the glass comprising at least 35 (in some embodiments, preferably at least 40, 45, 50, 55, 60, 65, or even at least 70) percent by weight $Al_2O_3$, based on the total weight of the glass, the first metal oxide other than $Al_2O_3$, and the second, different metal oxide other than $Al_2O_3$, wherein the glass contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the glass. In some embodiments, the fibers are glass fibers. In some embodiments, the fibers are substantially continuous (i.e., have a length to diameter of at least 1000:1).

In another aspect, the present invention provides a method for making ceramic comprising glass, the method comprising contacting a melt with a surface of a rotating substrate such that the melt cools to provide a ceramic comprising glass, the melt comprising at least 35 (in some embodiments, preferably at least 40, 45, 50, 55, 60, 65, or even at least 70) percent by weight $Al_2O_3$, based on the total weight of the melt, a first metal oxide other than $Al_2O_3$, and a second, different metal oxide other than $Al_2O_3$ (e.g., $Y_2O_3$, REO, MgO, $TiO_2$, $Cr_2O_3$, CuO, NiO, $Fe_2O_3$, and complex metal oxides thereof), wherein the $Al_2O_3$, first metal oxide, and second metal oxide collectively comprise at least 70 (in some embodiments, preferably at least 75, 80, 85, 90, 95, or 100) percent by weight of the melt, and wherein the melt contains not more than 30 (in some embodiments, preferably not more than 25, 20, 15, 10, 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the melt; and the glass comprising at least 35 (in some embodiments, preferably at least 40, 45, 50, 55, 60, 65, or even at least 70) percent by weight $Al_2O_3$, based on the total weight of the glass, the first metal oxide other than $Al_2O_3$, and the second, different metal oxide other than $Al_2O_3$, wherein the $Al_2O_3$, first metal oxide, and second metal oxide collectively comprise at least 70 (in some embodiments, preferably at least 75, 80, 85, 90, 95, or 100) percent by weight of the glass, and wherein the glass contains not more than 30 (in some embodiments, preferably not more than 25, 20, 15, 10, 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the glass. In some embodiments, the ceramic comprising glass is a fiber. In some embodiments, the fibers are substantially continuous (i.e., have a length to diameter of at least 1000:1). In some embodiments, a plurality the shapes (including particles, whiskers, fibers, and ribbons (i.e., a planar, elongated shape)) is provided.

For example, in some embodiments, this method comprises contacting a melt with a surface of a rotating substrate such that the melt cools to provide a plurality of fibers comprising glass, the melt comprising at least 35 (in some embodiments, preferably at least 40, 45, 50, 55, 60, 65, or even at least 70) percent by weight $Al_2O_3$, based on the total weight of the melt, a first metal oxide other than $Al_2O_3$, and a second, different metal oxide other than $Al_2O_3$ (e.g., $Y_2O_3$, REO, MgO, $TiO_2$, $Cr_2O_3$, CuO, NiO, $Fe_2O_3$, and complex metal oxides thereof), wherein the $Al_2O_3$, first metal oxide, and second metal oxide collectively comprise at least 70 (in some embodiments, preferably at least 75, 80, 85, 90, 95, or 100) percent by weight of the melt, and wherein the melt contains not more than 30 (in some embodiments, preferably not more than 25, 20, 15, 10, 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the melt; and the glass comprising at least 35 (in some embodiments, preferably at least 40, 45, 50, 55, 60, 65, or even at least 70) percent by weight $Al_2O_3$, based on the total weight of the glass, the first metal oxide other than $Al_2O_3$, and the second, different metal oxide other than $Al_2O_3$, wherein the $Al_2O_3$, first metal oxide, and second metal oxide collectively comprise at least 70 (in some embodiments, preferably at least 75, 80, 85, 90, 95, or 100) percent by weight of the glass, and wherein the glass contains not more than 30 (in some embodiments, preferably not more than 25, 20, 15, 10, 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the glass. In some embodiments, the fibers are glass fibers. In some embodiments, the fibers are substantially continuous (i.e., have a length to diameter of at least 1000:1).

Methods according to the present invention optionally further comprise heating the amorphous material such that that at least a portion of the amorphous material is converted to a glass-ceramic.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes amorphous material, glass, crystalline ceramic, glass-ceramic, and combinations thereof;

"complex metal oxide" refers to a metal oxide comprising two or more different metal elements and oxygen (e.g., $CeAl_1O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramics comprising crystals formed by heat-treating amorphous material;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_1$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be amorphous, crystalline, or portions amorphous and portions crystalline. For example if a glass-ceramic comprises $Al_2O_3$ and $ZrO_2$, the $Al_2O_3$ and $ZrO_2$ may each be in an amorphous state, crystalline state, or portions in an amorphous state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides.

Further, it is understood that glass-ceramics formed by heating amorphous material not exhibiting a $T_g$ may not actually comprise glass, but rather may comprise the crystals and amorphous material that does not exhibiting a $T_g$.

Examples of articles according of the present invention include kitchenware (e.g., plates), dental brackets, and reinforcing fibers, cutting tool inserts, abrasive materials, and structural components of gas engines, (e.g., valves and bearings). Other articles include those having a protective coating of ceramic on the outer surface of a body or other substrate.

DETAILED DESCRIPTION

The present invention provides methods of melt spinning melts to provide amorphous materials. Optionally embodiments of the amorphous materials are heat-treated to provide glass-ceramics.

Figure 4:
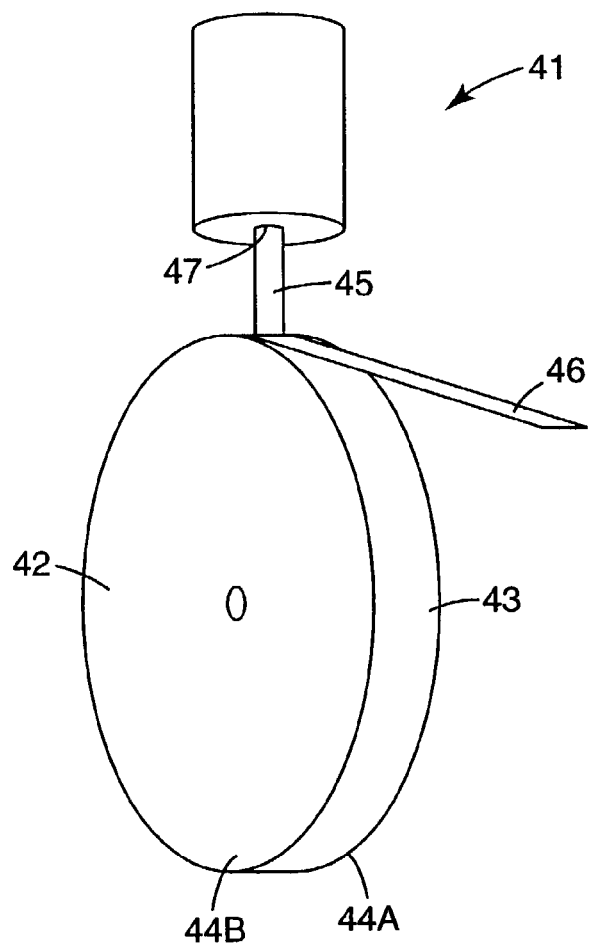
FIG. 4 is perspective view of a method according to the present invention.

An exemplary melt spinning process according to the present invention is shown in FIG. 4, wherein melt spinning apparatus 41 comprises rotating wheel 42 having surfaces 44A and 44B and circumferential surface 43. As shown, melt 45 is contacted with circumferential surface 43 to provide glass 46. In some embodiments, and as shown, melt 45 is directed toward circumferential surface 43 with aid or orifice 47. That is, melt 45 is forced through orifice 47 using techniques known in art the such as mechanical or gas pressure. Alternatively, or in addition, for example, melt 45 can be directed towards either, or both, surfaces 44A and 44B to provide glass.

Some embodiments of the melt, amorphous materials (including glasses), and glass-ceramics made there from comprise at least 35 (in some embodiments, preferably comprise at least 40, 45, 50, 55, 60, 65, or even at least 70; in some embodiments, preferably in a range from 60-70) percent by weight $Al_2O_3$, based on the total weight of the melt, amorphous material, or glass-ceramic, as applicable) and $Y_2O_3$ (in some embodiments, preferably comprise at least 0.5 percent by weight; in some embodiments, preferably in a range from 0.5 to 70, 0.5 to 50, or 1 to 25 percent by weight $Y_2O_3$, based on the total weight of the melt, amorphous material, or glass-ceramic, as applicable).

Some embodiments of the melt, amorphous materials (including glasses), and glass-ceramics made there from comprise at least 35 (in some embodiments, preferably comprise at least 40, 45, 50, 55, 60, 65, or even at least 70; in some embodiments, preferably in a range from 60-70) percent by weight $Al_2O_3$, based on the total weight of the melt, amorphous material, or glass-ceramic, as applicable) and REO (in some embodiments, preferably comprise at least 0.5 percent by weight; in some embodiments, preferably in a range from 0.5 to 70, 0.5 to 50, or 1 to 25 percent by weight $Y_2O_3$, based on the total weight of the melt, amorphous material, or glass-ceramic, as applicable).

Some embodiments of the melt, amorphous materials (including glasses), and glass-ceramics made there from comprise at least 35 (in some embodiments, preferably comprise at least 40, 45, 50, 55, 60, 65, or even at least 70; in some embodiments, preferably in a range from 60-70) percent by weight $Al_2O_3$, based on the total weight of the melt, amorphous material, or glass-ceramic, as applicable), $Y_2O_3$ (in some embodiments, preferably comprise at least 0.5 percent by weight; in some embodiments, preferably in a range from 0.5 to 70, 0.5 to 50, or 1 to 25 percent by weight $Y_2O_3$, based on the total weight of the melt, amorphous material, or glass-ceramic, as applicable), and at least one of $ZrO_2$ or $HfO_2$ (in some embodiments, preferably comprise at least 0.5 percent by weight; in some embodiments, preferably in a range from 0.5 to 70, 0.5 to 50, or 1 to 25, based on the total weight of the melt, amorphous material, and glass-ceramic, as applicable).

Some embodiments of the melt, amorphous materials (including glasses), and glass-ceramics made there from comprise at least 35 (in some embodiments, preferably comprise at least 40, 45, 50, 55, 60, 65, or even at least 70; in some embodiments, preferably in a range from 60-70) percent by weight $Al_2O_3$, based on the total weight of the melt, amorphous material, or glass-ceramic, as applicable), REO (in some embodiments, preferably comprise at least 0.5 percent by weight; in some embodiments, preferably in a range from 0.5 to 70, 0.5 to 50, or 1 to 25 percent by weight REO, based on the total weight of the melt, amorphous material, or glass-ceramic, as applicable), and at least one of $ZrO_2$ or $HfO_2$ (in some embodiments, preferably comprise at least 0.5 percent by weight; in some embodiments, preferably in a range from 0.5 to 70, 0.5 to 50, or 1 to 25 percent by weight, based on the total weight of the melt, amorphous material, and glass-ceramic, as applicable).

Typically, embodiments of the amorphous materials and glass-ceramics made there from have x, y, and z dimensions each perpendicular to each other, and wherein each of the x, y, and z dimensions is at least 10 micrometers, at least 25 micrometers, at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm, wherein those greater than about 50 are typically made by coalescing two or more pieces of amorphous material made via melt spinning.

The x, y, and z dimensions of a material are determined either visually or using microscopy, depending on the magnitude of the dimensions. The reported z dimension is, for example, the diameter of a sphere, the thickness of a coating, or the longest length of a prismatic shape.

Useful amorphous material formulations include those at or near a eutectic composition(s) (e.g., binary and ternary eutectic compositions). In addition to compositions disclosed herein, other compositions, including quaternary and other higher order eutectic compositions, may be apparent to those skilled in the art after reviewing the present disclosure.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide.other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Other useful metal oxide may also include, on a theoretical oxide basis, BaO, CaO, $Cr_2O_3$, CoO, $Fe_2O_3$, $GeO_2$, $Li_2O$, MgO, MnO, NiO, $Na_2O$, $Sc_2O_3$, SrO, $TiO_2$, ZnO, and combinations thereof. Sources, including commercial sources, include the oxides themselves, complex oxides, ores, carbonates, acetates, nitrates, chlorides, hydroxides, etc. These metal oxides are added to modify a physical property of the resulting abrasive particles and/or improve processing. These metal oxides are typically added anywhere from 0 to 50% by weight, in some embodiments preferably 0 to 25% by weight and more preferably 0 to 50% by weight of the glass-ceramic depending, for example, upon the desired property.

In some embodiments, it may be advantageous for at least a portion of a metal oxide source (in some embodiments, preferably, 10 15, 20, 25, 30, 35, 40, 45, or even at least 50 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise metal them with the other raw materials. Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions over 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size range. Another advantage of the invention include, in forming the amorphous materials, that many of the chemical and physical processes such as melting, densification and spherodizing can be achieved in a short time, so that very high quench rates be can achieved. For additional details, see copending application having U.S. Ser. No. 10/211,639, filed the same date as the instant application, the disclosure of which is incorporated herein by reference.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

In some instances, it may be preferred to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting abrasive particles and/or improve processing. These metal oxides when used are typically are added from greater than 0 to 20% by weight, preferably greater than 0 to 5% by weight and more preferably greater than 0 to 2% by weight of the glass-ceramic depending, for example, upon the desired property.

The addition of certain metal oxides may alter the properties and/or crystalline structure or microstructure of a glass-ceramic, as well as the processing of the raw materials and intermediates in making the glass-ceramic. For example, oxide additions such as MgO, CaO, $Li_2O$, and $Na_2O$ have been observed to alter both the $T_g$ (for a glass) and $T_x$ (wherein $T_x$ is the crystallization temperature) of amorphous material. Although not wishing to be bound by theory, it is believed that such additions influence glass formation. Further, for example, such oxide additions may decrease the melting temperature of the overall system (i.e., drive the system toward lower melting eutectic), and ease of amorphous material-formation. Complex eutectics in multi component systems (quaternary, etc.) may result in better amorphous material-forming ability. The viscosity of the liquid melt and viscosity of the glass in its' "working" range may also be affected by the addition of certain metal oxides such as MgO, CaO, $Li_2O$, and $Na_2O$. It is also within the scope of the present invention to incorporate at least one of halogens (e.g., fluorine and chlorine), or chalcogenides (e.g., sulfides, selenides, and tellurides) into the amorphous materials, and the glass-ceramics made there from.

Crystallization of the amorphous material and ceramic comprising the amorphous material may also be affected by the additions of certain materials. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the amorphous material upon reheating. In another aspect, for ceramics comprising crystalline $ZrO_2$, it may be desirable to add metal oxides (e.g., $Y_2O_3$, $TiO_2$, CaO, and MgO) that are known to stabilize tetragonal/cubic form of $ZrO_2$.

The particular selection of metal oxide sources and other additives for making the ceramics typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

The melt can be provided by heating the oxide sources to provide a melt. For example, crucible can be charged with the oxide sources and them heated to provide the melt. In some embodiments, the crucible has a orifice to discharge the melt. Common crucible materials are known in the art and include graphite, metals (e.g., platinum and platinum/rhodium) and ceramics (e.g. alumina). The crucible can be heated using techniques known in the art, including the use if resistance or induction furnaces.

To enhance the cooling of the melt on a surface of the rotating substrate, the substrate may be chilled using techniques known in the art (e.g., it may be a chill-wheel). Optionally, the methods according to the present invention are conducted with multiple rotating substrates (e.g., two or more chill-wheels). Alternatively, for example, embodiments of methods according to the present invention are conducted with stationary substrates, or with no substrates Optionally, the surface of the rotating substrate used to cool the melt may be flat, sharp, have grooves, etc to facilitate formation of a particular form such as ribbons, wires, etc. The rotating substrate can be made of materials known in the art for melt spinning, including metals such as copper and steel. Other materials with high thermal conductivity such as graphite may also be useful, depending, for example, on the nature of the melt and its reactivity or wetting properties toward a particular substrate material.

In another aspect, the speed of the rotating substrate may be adjusted, for example, to provide different cooling rates, to change the dimensions of the resulting amorphous material. It is also possible to use the inside surfaces of a hollow substrate (e.g., a wheel) to cool the melt.

To facilitate collection of the amorphous material, it may be desirable to have a collection chamber. In some embodiments, the inner cooling surfaces of a hollow wheel may be U-shaped, wherein other cooling media such as water or oils can be contained, to facilitate desired cooling rates.

Embodiments of the methods according to the present invention may, if desired, be conducted in a contained in an enclosure. Embodiments of the methods according to the present invention may, if desired, be conducted, for example, at high or low pressures, in air, inert or reactive gas atmospheres or vacuum.

The oxide sources for forming the melt may be, for example, in the form of blended fine powders or they may be blended and granulated by first dry or wet milling, followed by optionally drying and granulating, or granulating, for example, by spray drying. The oxide sources for forming the melt may also be, for example, previously fused, and which optionally may be subsequently crushed to provide granular of powdered feed. The oxide sources for forming the melt may also be, for example, previously spherodized material made, for example, by plasma spraying or other flame forming techniques.

The diameter or cross-section of the resulting amorphous material may be affected, for example, by a combination of factors such as viscosity of the melt, the orifice diameter, chill-wheel speed, heat-transfer rates, wetting properties of the melt on the chill-wheel material, and the solidification rate. In general, higher wheel speeds translate into thinner cross sectional shapes. Likewise lower viscosity melts tend to translate into thinner cross sectional shapes. If the viscosity is too low, then the melt stream may break into particulates, forming for example beads.

The microstructure or phase composition (glassy/amorphous/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous yield can be calculated for beads using a −100+120 mesh size fraction (i.e., the fraction collected between 150-micrometer opening size and 125-micrometer opening size screens). The measurements are done in the following manner. A single layer of beads is spread out upon a glass slide. The beads are observed using an optical microscope. Using the crosshairs in the optical microscope eyepiece as a guide, beads that lay along a straight line are counted either amorphous or crystalline depending on their optical clarity. A total of 500 beads are counted and a percent amorphous yield is determined by the amount of amorphous beads divided by total beads counted.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix.

For some uses, for example, abrasive particles and fillers, the as formed amorphous material or ceramic (including glass prior to crystallization) may be larger in size than that desired. The amorphous material or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material for re-melting if they are too small.

The shape of the ceramic (including glass prior to crystallization) may depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. The resulting particles may have an average aspect ratio ranging from 1:1 to 5:1, typically 1.25:1 to 3:1 and preferably 1.5:1 to 2.5:1.

It is also within the scope of the present invention, for example, to fabricate ceramics (including glass prior to crystallization) by coalescing. This coalescing step in essence forms a larger sized body from two or more smaller particles. For example, amorphous material comprising particles (obtained, for example, by crushing) (including beads and microspheres), fibers, etc. may formed into a larger particle size. For example, ceramic (including glass prior to crystallization), may also be provided by heating, for example, particles comprising the amorphous material, and/or fibers, etc. above the $T_g$ such that the particles, etc. coalesce to form a shape and cooling the coalesced shape. The temperature and pressure used for coalescing may depend, for example, upon composition of the amorphous material and the desired density of the resulting material. The temperature should below glass crystallization temperature, and for glasses, greater than the glass transition temperature. In certain embodiments, the heating is conducted at at least one temperature in a range of about 850° C. to about 1100° C. (in some embodiments, preferably 900° C. to 1000° C.). Typically, the amorphous material is under pressure (e.g., greater than zero to 1 GPa or more) during coalescence to aid the coalescence of the amorphous material. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressure, hot extrusion and the like. Typically, it is generally preferred to cool the resulting coalesced body before further heat treatment. After heat treatment if so desired, the coalesced body may be crushed to smaller particle sizes or a desired particle size distribution.

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material. Optionally, the resulting, coalesced article can be heat-treated to provide glass-ceramic, crystalline ceramic, or ceramic otherwise comprising crystalline ceramic.

Coalescence of the amorphous material and/or glass-ceramic (e.g., particles) may also be accomplished by a variety of methods, including pressureless or pressure sintering (e.g., sintering, plasma assisted sintering, hot pressing, HIPing, hot forging, hot extrusion, etc.).

Heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, preferably in a range from about 925° C. to about 1050° C. Likewise for the density step, the temperature typically is in a range from about 1100° C. to about 1600° C., in some embodiments, preferably in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace. It is within the scope of the present invention to convert (e.g., crush) the resulting article or heat-treated article to provide particles (e.g., abrasive particles).

The amorphous material is heat-treated to at least partially crystallize the amorphous material to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for amorphous materials made according to the present invention, determine the appropriate nucleation and/or crystal growth conditions to provide glass-ceramics of the abrasive particles.

Typically, glass-ceramics are stronger than the amorphous materials from which they are formed. Hence, the strength of the material may be adjusted, for example, by the degree to which the amorphous material is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example *Glass-Ceramics*, P. W. McMillan, Academic Press, Inc., $2^{nd}$ edition, 1979, the disclosure of which is incorporated herein by reference.

For example, during heat-treatment of some exemplary amorphous materials made according to methods according to present invention for making the glass-ceramics, formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the amorphous material. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10-15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

The size of the resulting crystals can typically controlled at least in part by the nucleation and/or crystallization times and/or temperatures. Although it is generally preferred to have small crystals (e.g., on the order not greater than a micrometer, or even not greater than a nanometer) the glass-ceramics may be made with larger crystal sizes (e.g., at least 1-10 micrometers, at least 10-25 micrometers, at least 50-100 micrometers, or even grater than 100 micrometers). Although not wanting to be bound by theory, it is generally believed in the art that the finer the size of the crystals (for the same density), the higher the mechanical properties (e.g., hardness and strength) of the ceramic.

Examples of crystalline phases which may be present in embodiments of glass-ceramics include: $Al_2O_3$ (e.g., $\alpha$-$Al_2O_3$), $Y_2O_3$, REO, $HfO_2$ $ZrO_2$ (e.g., cubic $ZrO_2$ and tetragonal $ZrO_2$), BaO, CaO, $Cr_2O_3$, CoO, $Fe_2O_3$, $GeO_2$, $Li_2O$, MgO, MnO, NiO, $Na_2O$, $P_2O_5$, $Sc_2O_3$, $SiO_2$, SrO, $TeO_2$, $TiO_2$, $V_2O_3$, $Y_2O_3$, ZnO, "complex metal oxides" (including "complex $Al_2O_3$.metal oxide (e.g., complex $Al_2O_3$.REO (e.g., $ReAlO_3$ (e.g., $GdAlO_3$ $LaAlO_3$), $ReAl_{11}O_{18}$ (e.g., $LaAl_{11}O_{18}$,), and $Re_3Al_5O_{12}$ (e.g., $Dy_3Al_5O_{12}$)), complex $Al_2O_3$.$Y_2O_3$ (e.g., $Y_3Al_5O_{12}$), and complex $ZrO_2$.REO (e.g., $Re_2Zr_2O_7$ (e.g., $La_2Zr_2O_7$))), and combinations thereof.

It is also with in the scope of the present invention to substitute a portion of the yttrium and/or aluminum cations in a complex $Al_2O_3$.metal oxide (e.g., complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$.$Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

It is also with in the scope of the present invention to substitute a portion of the rare earth and/or aluminum cations in a complex $Al_2O_3$.metal oxide (e.g., complex $Al_2O_3$.REO) with other cations. For example, a portion of the Al cations in a complex $Al_2O_3$.REO may be substituted with at least one cation of an element selected from the group consisting of: Cr, Ti, Sc, Fe, Mg, Ca, Si, Co, and combinations thereof. For example, a portion of the Y cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine the average crystal size as follows. The number of crystals that intersect per unit length ($N_L$) of a random straight line drawn across the micrograph are counted. The average crystal size is determined from this number using the following equation.

$$\text{Average Crystal Size} = \frac{1.5}{N_L M}$$

Where $N_L$ is the number of crystals intersected per unit length and M is the magnification of the micrograph.

Some embodiments of the glass-ceramics include glass-ceramics comprising alpha alumina having at least one of an average crystal size not greater than 150 nanometers.

Some embodiments of the glass-ceramics include glass-ceramics comprising alpha alumina, wherein at least 75 (in some embodiments preferably, 80, 85, 90, 95, or even 100) percent by number of the alpha alumina present in such portion have crystal sizes not greater than 200 nanometers.

Some embodiments of the glass-ceramics include glass-ceramics comprising alpha $Al_2O_3$, crystalline $ZrO_2$, and a first complex $Al_2O_3$.$Y_2O_3$, and wherein at least one of the alpha $Al_2O_3$, the crystalline $ZrO_2$, or the first complex $Al_2O_3$.$Y_2O_3$ has an average crystal size not greater than 150 nanometers. In some embodiments preferably, the glass-ceramics further comprise a second, different complex $Al_2O_3$.$Y_2O_3$. In some embodiments preferably, the glass-ceramics further comprise a complex $Al_2O_3$.REO.

Some embodiments of the glass-ceramics include glass-ceramics comprising a first complex $Al_2O_3$.$Y_2O_3$, a second, different complex $Al_2O_3$.$Y_2O_3$, and crystalline $ZrO_2$, and wherein for at least one of the first complex $Al_2O_3$.$Y_2O_3$, the second complex $Al_2O_3$.$Y_2O_3$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a second, different complex $Al_2O_3$.$Y_2O_3$. In some embodiments preferably, the glass-ceramics further comprise a complex $Al_2O_3$.REO.

Some embodiments of the glass-ceramics include glass-ceramics comprising alpha $Al_2O_3$, crystalline $ZrO_2$, and a first complex $Al_2O_3$.REO, and wherein at least one of the alpha $Al_2O_3$, the crystalline $ZrO_2$, or the first complex $Al_2O_3$.REO has an average crystal size not greater than 150 nanometers. In some embodiments preferably, the glass-ceramics further comprise a second, different complex $Al_2O_3$.REO. In some embodiments preferably, the glass-ceramics further comprise a complex $Al_2O_3$.$Y_2O_3$.

Some embodiments of the glass-ceramics include glass-ceramics comprising a first complex $Al_2O_3$.REO, a second, different complex $Al_2O_3$.REO, and crystalline $ZrO_2$, and wherein for at least one of the first complex $Al_2O_3$.REO, the second complex $Al_2O_3$.REO, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3 \cdot Y_2O_3$.

Some embodiments of the glass-ceramics include glass-ceramics comprising a first complex $Al_2O_3 \cdot Y_2O_3$, a second, different complex $Al_2O_3 \cdot Y_2O_3$, and crystalline $ZrO_2$, and wherein at least one of the first complex $Al_2O_3 \cdot Y_2O_3$, the second, different complex $Al_2O_3 \cdot Y_2O_3$, or the crystalline $ZrO_2$ has an average crystal size not greater than 150 nanometers. In some embodiments preferably, the glass-ceramics further comprise a second, different complex $Al_2O_3 \cdot Y_2O_3$. In some embodiments preferably, the glass-ceramics further comprise a complex $Al_2O_3 \cdot REO$.

Some embodiments of the glass-ceramics include glass-ceramics comprising a first complex $Al_2O_3 \cdot Y_2O_3$, a second, different complex $Al_2O_3 \cdot Y_2O_3$, and crystalline $ZrO_2$, and wherein for at least one of the first complex $Al_2O_3 \cdot Y_2O_3$, the second, different complex $Al_2O_3 \cdot Y_2O_3$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3 \cdot REO$.

Some embodiments of the glass-ceramics include glass-ceramics comprising a first complex $Al_2O_3 \cdot REO$, a second, different complex $Al_2O_3 \cdot REO$, and crystalline $ZrO_2$, and wherein at least one of the first complex $Al_2O_3 \cdot REO$, the second, different complex $Al_2O_3 \cdot REO$, or the crystalline $ZrO_2$ has an average crystal size not greater than 150 nanometers. In some embodiments preferably, the glass-ceramics further comprise a second, different complex $Al_2O_3 \cdot REO$. In some embodiments preferably, the glass-ceramics further comprise a complex $Al_2O_3 \cdot Y_2O_3$.

Some embodiments of the glass-ceramics include glass-ceramics comprising a first complex $Al_2O_3 \cdot REO$, a second, different complex $Al_2O_3 \cdot REO$, and crystalline $ZrO_2$, and wherein for at least one of the first complex $Al_2O_3 \cdot REO$, the second, different complex $Al_2O_3 \cdot REO$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3 \cdot Y_2O_3$.

In some embodiments, glass-ceramics of the abrasive particles comprise at least 75, 80, 85, 90, 95, 97, 98, 99, or even 100 percent by volume crystallites, wherein the crystallites have an average size of less than 1 micrometer. In some embodiments, glass-ceramics of the abrasive particles comprise not greater than at least 75, 80, 85, 90, 95, 97, 98, 99, or even 100 percent by volume crystallites, wherein the crystallites have an average size not greater than 0.5 micrometer. In some embodiments, glass-ceramics of the abrasive particles comprise less than at 75, 80, 85, 90, 95, 97, 98, 99, or even 100 percent by volume crystallites, wherein the crystallites have an average size not greater than 0.3 micrometer. In some embodiments, the glass-ceramics comprise less than at least 75, 80, 85, 90, 95, 97, 98, 99, or even 100 percent by volume crystallites, wherein the crystallites have an average size not greater than 0.15 micrometer.

Crystals formed by heat-treating amorphous material made according to methods of the present invention to provide embodiments of glass-ceramics may be, for example, equi-axed, columnar, or flattened splat-like features.

Typically, the (true) density, sometimes referred to as specific gravity, of ceramics made according to methods of the present invention is at least 70% of theoretical density. More desirably, the (true) density of ceramics made according to methods of the present invention is at least 75%, 80%, 85%, 90%, 92%, 95%, 96%, 97%, 98%, 99%, 99.5% or even 100% of theoretical density. The abrasive particles have (true) densities of at least 85%, 90%, 92%, 95%, 96%, 97%, 98%, 99%, 99.5% or even 100% of theoretical density.

The average hardness of the material of the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

In some embodiments, the average hardness of glass-ceramics made according to methods of the present invention is at least 12, 13, 14, 15, 16, 17, or even at least 18 GPa), Abrasive particles made according to the present invention have an average hardness of at least 15 GPa, in some embodiments, at least at least 16 GPa, 17 GPa, or even at least 18 GPa.

Additional details regarding amorphous materials and glass-ceramics, including making, using, and properties thereof, can be found in application having U.S. Serial Nos. 09/922;526, 09/922,527, and 09/922,530, filed August 2, 2001, and U.S. Serial Nos. 10/211,598; 10/211,630; 10/211, 639; 10/211,034; 10/211,044; 10/211,628; and 10/211,640, filed the same date as the instant application, the disclosures of which are incorporated herein by reference.

Abrasive particles made by methods according to the present invention generally comprise crystalline ceramic (in some embodiments, preferably at least 75, 80, 85, 90, 91, 92, 93, 94, 95, 96, 97, 98, 99, 99.5, or even 100 percent by volume) crystalline ceramic.

The abrasive particles can be incorporated into an abrasive article, or used in loose form. The abrasive articles comprise binder and a plurality of abrasive particles, wherein at least a portion of the abrasive particles are the abrasive particles made by a method according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, preferably, at least 5, 10, 15, 20, 25, 30, 35, 40, 45, 50 55, 60, 65, 70, 75, 80, 85, 90, 95, or even 100 percent by weight of the abrasive particles in an abrasive article are the abrasive particles made by a method according to the present invention, based on the total weight of the abrasive particles in the abrasive article.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles made by a method according to the present invention. In some embodiments, preferably, at least 5, 10, 15, 20, 25, 30, 35, 40, 45, 50 55, 60, 65, 70, 75, 80, 85, 90, 95, or even 100 percent by weight of the plurality of abrasive particles are the abrasive particles made by a method according to the present invention, based on the total weight of the plurality of abrasive particles.

ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Preferred ANSI grades comprising abrasive particles according to the present invention are ANSI 8-220. FEPA grade designations include P8, P12, P16, P24, P36, P40, P50, P60, P80, P100, P120, P150, P180, P220, P320, P400, P500, P600, P800, P1000, and P1200. Preferred FEPA grades comprising abrasive particles according to the present invention are P12-P220. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10,000. Preferred JIS grades comprising abrasive particles according to the present invention are JIS8-220.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form amorphous material. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating amorphous (e.g., glass) comprising particles such that at least a portion of the amorphous material converts to glass-ceramic to provide abrasive particles comprising the glass-ceramic. The present invention also provides a method for making abrasive particles comprising a glass-ceramic, the method comprising heat-treating amorphous material such that at least a portion of the amorphous material converts to glass-ceramic, and crushing the resulting heat-treated material to provide the abrasive particles. When crushed, glass tends to provide sharper particles than crushing significantly crystallized glass-ceramics or crystalline material.

In another aspect, the present invention provides agglomerate abrasive grains each comprise a plurality of abrasive particles made by a method according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) made by a method according to the present invention. Methods of making such abrasive articles and using abrasive articles using abrasive particles are well known to those skilled in the art. Furthermore, abrasive particles made by a method according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

Figure 1:
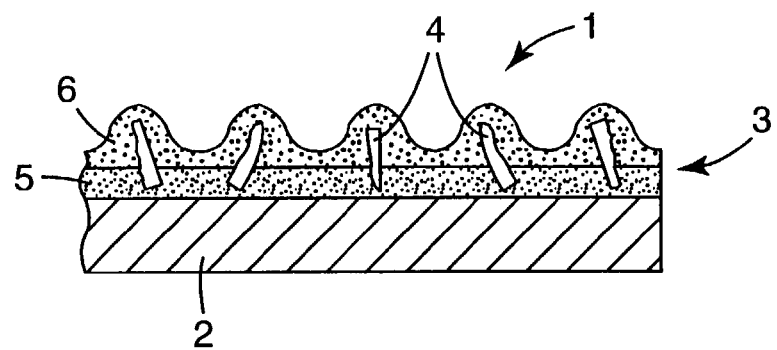
FIG. 1 is a fragmentary cross-sectional schematic view of a coated abrasive article including abrasive particles made according to a method of the present invention.

An example of a coated abrasive article is depicted in FIG. 1. Referring to this figure, coated abrasive article according to the present invention 1 has a backing (substrate) 2 and abrasive layer 3. Abrasive layer 3 includes abrasive particles made by a method according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3-50% by volume bond material, about 30-90% by volume abrasive particles (or abrasive particle blends), up to 50% by volume additives (including grinding aids), and up to 70% by volume pores, based on the total volume of the bonded abrasive article.

Figure 2:
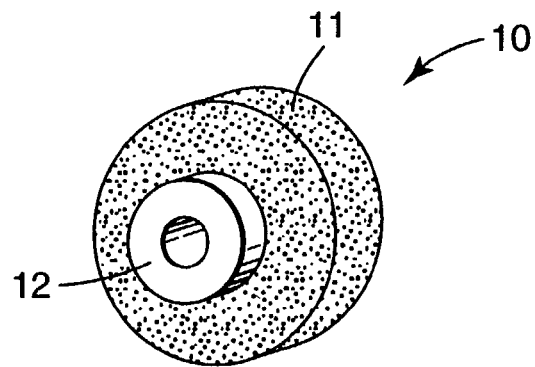
FIG. 2 is a perspective view of a bonded abrasive article including abrasive particles made according to a method of the present invention.

A preferred form is a grinding wheel. Referring to FIG. 2, grinding wheel 10 is depicted, which includes abrasive particles made by a method according to the present invention 11, molded in a wheel and mounted on hub 12.

Figure 3:
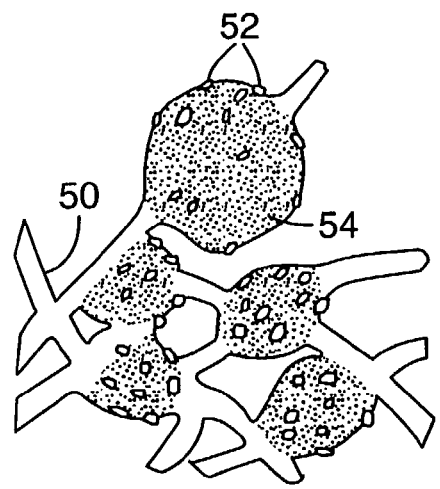
FIG. 3 is an enlarged schematic view of a nonwoven abrasive article including abrasive particles made according to a method of the present invention.

Nonwoven abrasive articles typically include an open porous lofty polymer filament structure having abrasive particles made by a method according to the present invention distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive article is provided. Such a nonwoven abrasive article according to the present invention comprises fibrous mat 50 as a substrate, onto which abrasive particles made by a method according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles may be in the shape of a wheel (including cut off wheels), honing stone, mounted pointed or other conventional bonded abrasive shape. A preferred vitrified bonded abrasive article is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

Preferred vitrified bonding materials may include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50-300 $g/m^2$ (desirably, about 80-160 $g/m^2$). In vitrified bonded abrasive articles grinding aid is typically impregnated into the pores of the article.

The abrasive articles can contain 100% abrasive particles made by a method according to the present invention, or blends of such abrasive particles with other abrasive particles and/or diluent particles. However, at least about 2% by weight, desirably at least about 5% by weight, and more desirably about 30-100% by weight, of the abrasive particles in the abrasive articles should be abrasive particles made by a method according to the present invention. In some instances, the abrasive particles made by a method according to the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.) U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et. al), U.S. Pat. No. 5,143,522 (Gibson et al.), and U.S. Pat. No. 5,336,280 (Dubots et. al), and applications having U.S. Serial No. 09/495,978 now abandoned, Ser. No. 09/496,442 now abandoned, Ser. No. 09/496,638 now abandoned, and Ser. No. 09/496,713 now abandoned, each filed on Feb. 2, 2000, and, Ser. No. 09/618,876, filed on Jul. 19, 2000, Ser. No. 09/618,879 now U.S. Pat. No. 6,607,570 (Rosenflanz et al.), Ser. No. 09/619,106 now U.S. Pat. No. 6,583,080 (Rosenflanz)), Ser. No. 09/619,191 now U.S. Pat. No. 6.669,749 (Rosenflanz et al.), Ser. No. 09/619,192 now U.S. Pat. No. 6,582,488 (Rosenflanz), Ser. No. 09/619,215 now U.S. Pat. No. 6,458,731 (Rosenflanz), Ser. No. 09/619,289 now U.S. Pat. No. 6,589,305 (Rosenflanz), Ser. No. 09/619,563 now U.S. Pat. No. 6,451,077 (Rosenflanz), Ser. No. 09/619,729 now U.S. Pat. No. 6,454,822 (Rosenflanz), Ser. No. 09/619,744 now U.S. Pat. No. 6,666,750 (Rosenflanz), and Ser. No. 09/620,262 now U.S. Pat. No. 6,592,640 (Rosenflanz et al.), each filed on Jul. 19, 2000, and Ser. No. 09/772,730 now U.S. Pat. No. 6,596,041 (Rosenflanz), filed Jan. 30, 2001. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles made by a method according to the present invention, with the smaller sized particles being another abrasive particle type. Conversely, for example, the smaller sized abrasive particles may be abrasive particles made by a method according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles made by a method according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al), U.S. Pat. No. 5,549,962 (Holmes et al.), and U.S. Pat. No. 5,975,988 (Christinason), and applications having U.S. Serial Nos. 09/688,444 which issued as U.S. Pat. No. 6,521,004 (Culler et al.), and Ser. No. 09/688,484 now abandoned, filed Oct. 16, 2000, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles made by a method according to the present invention, and the second (outermost) layer comprises abrasive particles made by a method according to the present invention. Likewise in a bonded abrasive, there may be two distinct sections of the grinding wheel. The outermost section may comprise abrasive particles made by a method according to the present invention, whereas the innermost section does not. Alternatively, abrasive particles made by a method according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5, 609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christinason), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle made by a method according to the present invention, with a surface of a workpiece; and moving at least of one the abrasive particle or the contacted surface to abrade at least a portion of said surface with the abrasive particle. Methods for abrading with abrasive particles made by a method according to the present invention range of snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles made by a method according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles made by a method according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Embodiments of particulate amorphous and glass-ceramics made according to a method of the present invention may be useful, for example, as fillers in polymeric, metallic, or ceramic matrix composites, as feed particles for plasma spraying, or raw materials for forming ceramic materials. Transparent forms may be used as retro-reflective beads. Embodiments of particulate amorphous and glass-ceramics made according to a method of the present invention may be viscoelastically deformed into simple or complex shaped bulk materials.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES

Examples 1-2

A 250-ml polyethylene bottle (7.3-cm diameter) was charged with a 50-gram mixture of various powders (as shown below in Table 1, with sources of the raw materials listed in Table 2), 75 grams of isopropyl alcohol, and 200 grams of alumina milling media (cylindrical shape, both height and diameter of 0.635 cm; 99.9% alumina; obtained from Coors, Golden, Colo.). The contents of the polyethylene bottle were milled for 16 hours at 60 revolutions per minute (rpm), the milling media were removed and the slurry was poured onto a warm (approximately 75° C.) glass ("PYREX") pan where it dried within 3 minutes. The dried powder was then screened through a 70-mesh screen (212-micrometer opening size screen) with the aid of a paintbrush.

TABLE 1

| Example | Weight percent of components | Batch amounts, g |
|---|---|---|
| 1 | $Al_2O_3$: 38.5 | $Al_2O_3$: 19.3 |
|   | $La_2O_3$: 42.5 | $La_2O_3$: 21.3 |
|   | $ZrO_2$: 19.0 | $ZrO_2$: 9.5 |
| 2 | $Al_2O_3$: 57.5 | $Al_2O_3$: 28.8 |
|   | $Y_2O_3$: 27.6 | $Y_2O_3$: 13.8 |
|   | $ZrO_2$: 14.9 | $ZrO_2$: 7.5 |

TABLE 2

| Raw Material | Source |
|---|---|
| Alumina particles ($Al_2O_3$) | Obtained from Alcoa Chemicals, under trade designation "A16SG" |
| Lanthanum oxide particles ($La_2O_3$) | Obtained from Molycorp Inc., Mountain Pass, CA and calcined at 700° C. for 6 hours prior to batch mixing |
| Yttrium oxide particles ($Y_2O_3$) | Obtained from H.C. Stark Newton, MA |
| Zirconium oxide particles ($ZrO_2$) | Obtained from Zirconia Sales, Inc. of Marietta, GA under trade designation "DK-2" |

Example 3

Approximately 7 grams of the feed particles of Example 1 were cold isostatically pressed (CIPed), at 207 megapascals (MPa) (30 ksi) in a rubber bag, into a pellet, 1 centimeter (cm) in diameter, and 5 cm in length. Cold isostatic pressing was done in oil (to apply pressure uniformly from all directions) so, to protect the sample from soaking in oil, the sample was placed in a rubber bag (diameter of 1 cm) to contain the samples during CIPing.

The pellet was placed in a graphite cylindrical crucible with a diameter of 1.25 cm. The bottom of the crucible was tapered and approximately 2 millimeters (mm) thick at the orifice opening. The orifice opening was 0.82 mm in diameter. The sample was heated using a standard 15 kilowatt (KW) (operating at 450 kHz) inductively heated unit under a partial pressure of He gas. No attempt was made to monitor or control the temperature of the chamber. Heating and melting occurred very rapidly, within a few seconds. After initial melting was observed, evidenced by the melt dripping through the orifice) overpressure (measured by a differential pressure nanometer, $\Delta P$ (i.e., the difference in pressure over the molten sample in the crucible and inside the apparatus (i.e., outside the crucible))=20 MPa (150 torr)) was applied to force the melt out onto the edge of a rotating oxygen free high-conductivity (OFHC) copper wheel, rotating at 10 meters per second (m/s). The maximum temperature observed was 1639° C. A schematic of the apparatus is shown in FIG. 4. A non-continuous melt stream exited out of the crucible and hit the rotating wheel as spheres. The rotating copper wheel further broke apart the melt stream, and the resulting quenched material was a plurality of spherical particles.

Example 4

A second charge of 7 grams of the feed particles of Example 1 was prepared and melt-spun as described in Example 3, except the orifice opening was 1.1 mm in diameter. Again a non-continuous melt stream was established. A fraction of the melt hit the rotating copper wheel and was expelled as spherical particles. However, the majority of the melt was deformed and quenched by the copper wheel resulting in whiskers and flakes. Visual inspection using optical microscopy showed the whiskers and flakes were transparent, which suggest amorphous material.

Example 5

A charge of 7 grams of the feed particles of Example 2 was prepared and melt-spun as described in Example 3, except the orifice opening was 1.1 mm in diameter. This time a continuous melt stream was established. A schematic of the apparatus is shown in FIG. 4. A continuous melt puddle was formed on the surface of the copper wheel, from which a ribbon was continuously spun. The ribbon contacted the edge of the apparatus, causing it to break into ribbons approximately 30-50 mm long, with an approximate thickness of 50 micrometers. It is believed that longer ribbons could be produced if contact with the apparatus were avoided.

Differential thermal analysis (DTA) was conducted using the following method. The ribbons were crushed using a mortar and pestle. DTA runs were made (using an instrument obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). The amount of each screened sample placed in a 100-microliter $Al_2O_3$ sample holder was about 400 milligrams. Each sample was heated in static air at a rate of 10° C./minute from room temperature (about 25° C.) to 1100° C.

Figure 5:
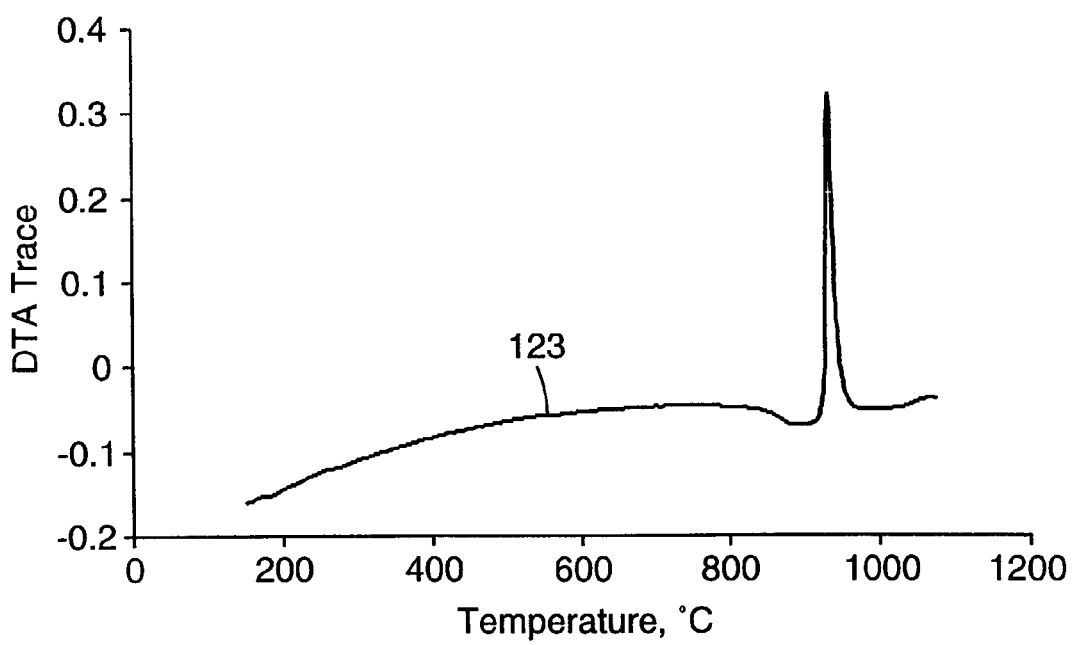
FIG. 5 is a DTA trace of a sample prepared according to Example 5.

Referring to FIG. 5 line 123 is the plotted DTA data for this material. Referring to FIG. 5, line 123, the material exhibited an endothermic event at a temperature around 872° C., as evidenced by the downward curve of line 123. It is believed this event was due to the glass transition (Tg) of the glass material. At about 958° C., an exothermic event was observed as evidenced by the sharp peak in line 123. It is believed that this event was due to the crystallization (Tx) of the material.

Example 6

Several of the ribbons produced in Example 5 (about 25 grams) were placed in a graphite die and hot-pressed using a uniaxial pressing apparatus (obtained under the trade designation "HP-50", Thermal Technology Inc., Brea, Calif.). The hot-pressing was carried out in an argon atmosphere and 13.8 MPa (2000 pounds per square inch (2 ksi)) pressure. The hot-pressing furnace was ramped up to 970° C., at 25° C./minute. The result was sheets consisting of several ribbons pressed together. The resulting sheets were glassy as determined from a DTA trace of the sheets, which showed a glass transition temperature, and a crystallization temperature similar to the unpressed ribbons.

Example 7

The feed particles of Example 1 were fed directly into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The particles were melted in the flame and transported to an inclined stainless steel surface (approximately 51 centimeters (20 inches) wide with a slope angle of 45 degrees) with cold water running over (approximately 8 liters/minute) the surface to form beads. The resulting molten and quenched beads were collected in a pan and dried at 110° C. The beads were amorphous as determined by their transparency under optical microscopy. They were spherical in shape and varied in size from a few micrometers up to 250 micrometers.

A composite consisting of alternating layers of these beads and the ribbons made in Example 5 were hot pressed as follows. The first layer consisted of 5 grams of beads laid into a graphite die, on top of which 1 gram of ribbons were laid out. The first and second layers were repeated and topped off with a final layer of 5 grams of beads. The combination was then hot pressed as described in Example 6. At the hot-pressing temperature and pressure the beads were able to flow around the ribbons and coalesce into a single bulk material. The result was a composite of the ribbons prepared in Example 5 in a matrix of coalesced beads.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making ceramic comprising glass, the method comprising:
   contacting a melt with a surface of a rotating substrate such that the melt cools to provide a ceramic comprising glass, the melt comprising at least 35 percent by weight $Al_2O_3$, based on the total metal oxide content of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total metal oxide content of the melt, and does not contain CaO; and the glass comprising at least 35 percent by weight $Al_2O_3$, based on the total metal oxide content of the glass, the first metal oxide other than $Al_2O_3$, and the second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and does not contain CaO.

2. The method according to claim 1 wherein the glass has x, y, and z dimensions each perpendicular to each other, and wherein each of the x, y, and z dimensions is at least 10 micrometers.

3. The method according to claim 1 wherein the melt spinning provides a plurality of shapes.

4. The method according to claim 1 wherein the ceramic is glass.

5. A method for making ceramic comprising glass, the method comprising:
   contacting a melt with a surface of a rotating substrate such that the melt cools to provide a ceramic comprising glass, the melt comprising at least 35 percent by weight $Al_2O_3$, based on the total weight of the melt, a first metal oxide other than $Al_2O_3$, and a second, different metal oxide other than $Al_2O_3$, wherein the $Al_2O_3$, first metal oxide, and second metal oxide collectively comprise at least 70 percent by weight of the melt, and wherein the melt contains not more than 30 percent by weight collectively $As_2O_3$, $B_2O_3$, $GeO_2$, $P_2O_5$, $SiO_2$, $TeO_2$, and $V_2O_5$, based on the total weight of the melt, and not more than 25 percent by weight CaO, based on the total weight of the melt; and the glass comprising at least 35 percent by weight $Al_2O_3$, based on the total weight of the glass, the first metal oxide other than $Al_2O_3$, and the second, different metal oxide other than $Al_2O_3$, wherein the $Al_2O_3$, first metal oxide, and second metal oxide collectively comprise at least 70 percent by weight of the glass, and wherein the glass contains not more than 30 percent by weight collectively $As_2O_3$, $B_2O_3$, $GeO_2$, $P_2O_5$, $SiO_2$, $TeO_2$, and $V_2O_5$, based on the total weight of the glass, and not more than 25 percent by weight CaO, based on the total weight of the glass; wherein the first and second metal oxides are each selected from the group consisting of $Y_2O_3$, REO, MgO, $TiO_2$, $Cr_2O_3$, CuO, NiO, and $Fe_2O_3$.

6. The method according to claim 5 wherein the glass has x, y, and z dimensions each perpendicular to each other, and wherein each of the x, y, and z dimensions is at least 10 micrometers.

7. The method according to claim 1 wherein the melt spinning provides a plurality of shapes.

8. A method for making a plurality of fibers comprising glass, the method comprising:
contacting a melt with a surface of a rotating substrate such that the melt cools to provide a plurality of fibers comprising glass, the melt comprising at least 35 percent by weight $Al_2O_3$, based on the total weight of the melt, and a first metal oxide other than $Al_2O_3$ and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt, and does not contain CaO; and the glass comprising at least 35 percent by weight $Al_2O_3$, based on the total weight of the glass, the first metal oxide other than $Al_2O_3$, and the second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and does not contain CaO.

9. The method according to claim 8 wherein the glass of at least some of the fibers has x, y, and z dimensions each perpendicular to each other, and wherein each of the x, y, and z dimensions is at least 10 micrometers.

10. A method for making a plurality of fibers comprising glass, the method comprising:
contacting a melt with a surface of a rotating substrate such that the melt cools to provide a plurality of fibers comprising glass, the melt comprising at least 35 percent by weight $Al_2O_3$, based on the total weight of the melt, a first metal oxide other than $Al_2O_3$, and a second, different metal oxide other than $Al_2O_3$, wherein the $Al_2O_3$, first metal oxide, and second metal oxide collectively comprise at least 70 percent by weight of the melt, and wherein the melt contains not more than 30 percent by weight collectively $As_2O_3$, $B_2O_3$, $GeO_2$, $P_2O_5$, $SiO_2$, $TeO_2$, and $V_2O_5$, based on the total weight of the melt, and not more than 25 percent by weight CaO, based on the total weight of the melt; and the glass comprising at least 35 percent by weight $Al_2O_3$, based on the total weight of the glass, the first metal oxide other than $Al_2O_3$, and the second, different metal oxide other than $Al_2O_3$, wherein the $Al_2O_3$, first metal oxide, and second metal oxide collectively comprise at least 70 percent by weight of the glass, and wherein the glass contains not more than 30 percent by weight collectively $As_2O_3$, $B_2O_3$, $GeO_2$, $P_2O_5$, $SiO_2$, $TeO_2$, and $V_2O_5$, based on the total weight of the glass, and not more than 25 percent by weight CaO, based on the total weight of the glass; wherein the first and second metal oxides are each selected from the group consisting of $Y_2O_3$, REO, MgO, $TiO_2$, $Cr_2O_3$, CuO, NiO, and $Fe_2O_3$.

11. The method according to claim 10 wherein the glass of at least some of the fibers has x, y, and z dimensions each perpendicular to each other, and wherein each of the x, y, and z dimensions is at least 10 micrometers.

12. A method for making glass-ceramic, the method comprising:
contacting a melt with a surface of a rotating substrate such that the melt cools to provide a ceramic comprising glass, the melt comprising at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O$, based on the total weight of the melt, and does not contain CaO; and the glass comprising at least 35 percent by weight $Al_2O_3$, based on the total weight of the glass, the first metal oxide other than $Al_2O_3$, and the second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and does not contain CaO; and
heat-treating the ceramic comprising glass such that at least a portion of the glass is converted to a glass-ceramic.

13. The method according to claim 12 wherein at least a portion of the glass has x, y, and z dimensions each perpendicular to each other, and wherein each of the x, y, and z dimensions is at least 10 micrometers.

14. A method for making glass-ceramic, the method comprising:
contacting a melt with a surface of a rotating substrate such that the melt cools to provide a ceramic comprising glass, the melt comprising at least 35 percent by weight $Al_2O_3$, based on the total weight of the melt, a first metal oxide other than $Al_2O_3$, and a second, different metal oxide other than $Al_2O_3$, wherein the $Al_2O_3$, first metal oxide, and second metal oxide collectively comprise at least 70 percent by weight of the melt, and wherein the melt contains not more than 30 percent by weight collectively $As_2O_3$, $B_2O_3$, $GeO_2$, $P_2O_5$, $SiO_2$, $TeO_2$, and $V_2O_5$, based on the total weight of the melt, and not more than 25 percent by weight CaO, based on the total weight of the melt; and the glass comprising at least 35 percent by weight $Al_2O_3$, based on the total weight of the glass, the first metal oxide other than $Al_2O_3$, and the second, different metal oxide other than $Al_2O_3$, wherein the $Al_2O_3$, first metal oxide, and second metal oxide collectively comprise at least 70 percent by weight of the glass, and wherein the glass contains not more than 30 percent by weight collectively $As_2O_3$, $B_2O_3$, $GeO_2$, $P_2O_5$, $SiO_2$, $TeO_2$, and $V_2O_5$, based on the total weight of the glass, and not more than 25 percent by weight CaO, based on the total weight of the glass, wherein the first and second metal oxides are each selected from the group consisting of $Y_2O_3$, REO, MgO, $TiO_2$, $Cr_2O_3$, CuO, NiO, and $Fe_2O_3$; and
heat-treating the ceramic comprising glass such that at least a portion of the glass is converted to a glass-ceramic.

15. The method according to claim 14 wherein at least a portion of the glass has x, y, and z dimensions each perpendicular to each other, and wherein each of the x, y, and z dimensions is at least 10 micrometers.

16. A method for making a plurality of fibers comprising a glass-ceramic, the method comprising:

contacting a melt with a surface of a rotating substrate such that the melt cools to provide a plurality of fibers comprising glass, the melt comprising at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt, and does not contain CaO; the glass comprising at least 35 percent by weight $Al_2O_3$, based on the total weight of the glass, the first metal oxide other than $Al_2O_3$, and the second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, and does not contain CaO; and heat-treating the fibers comprising glass such that at least a portion of the glass is converted to a glass-ceramic.

17. The method according to claim 16 wherein the glass of at least some of the fibers has x, y, and z dimensions each perpendicular to each other, and wherein each of the x, y, and z dimensions is at least 10 micrometers.

18. A method for making a plurality of fibers comprising a glass-ceramic, the method comprising:

contacting a melt with a surface of a rotating substrate such that the melt cools to provide a plurality of fibers comprising glass, the melt comprising at least 35 percent by weight $Al_2O_3$, based on the total weight of the melt, a first metal oxide other than $Al_2O_3$, and a second, different metal oxide other than $AL_2O_3$, wherein the $Al_2O_3$, first metal oxide, and second metal oxide collectively comprise at least 70 percent by weight of the melt, and wherein the melt contains not more than 30 percent by weight collectively $As_2O_3$, $B_2O_3$, $_{GeO2}$, $P_2O_5$, $SiO_2$, $TeO_2$, and $V_2O_5$, based on the total weight of the melt, and not more than 25 percent by weight CaO, based on the total weight of the melt; and the glass comprising at least 35 percent by weight $Al_2O_3$, based on the total weight of the glass, the first metal oxide other than $Al_2O_3$, and the second, different metal oxide other than $Al_2O_3$, wherein the $Al_2O_3$, first metal oxide, and second metal oxide collectively comprise at least 70 percent by weight of the glass, and wherein the glass contains not more than 30 percent by weight collectively $As_2O_3$, $B_2O_3$, $GeO_2$, $P_2O_5$, $SiO_2$, $TeO_2$, and $V_2O_5$, based on the total weight of the glass, and not more than 25 percent by weight CaO, based on the total weight of the glass, wherein the first and second metal oxides are each selected from the group consisting of $Y_2O_3$, REO, MgO, $TiO_2$, $Cr_2O_3$, CuO, NiO, and $Fe_2O_3$; and heat-treating the glass such that at least a portion of the glass is converted to a glass-ceramic.

19. The method according to claim 18 wherein the glass of at least some of the fibers has x, y, and z dimensions each perpendicular to each other, and wherein each of the x, y, and z dimensions is at least 10 micrometers.

* * * * *

UNITED STATES PATENT AND TRADEMARK OFFICE
CERTIFICATE OF CORRECTION

PATENT NO. : 8,056,370 B2  
APPLICATION NO. : 10/211684  
DATED : November 15, 2011  
INVENTOR(S) : Anatoly Z Rosenflanz Page 1 of 1

It is certified that error appears in the above-identified patent and that said Letters Patent is hereby corrected as shown below:

Column 3  
Line 60, delete "$CeAl_1O_{18}$," and insert -- $CeAl_{11}O_{18}$, --.

Column 4  
Line 18, delete "(e.g., $Pr_6O_1$)," and insert -- (e.g., $Pr_6O_{11}$), --.

Column 26  
Lines 49-50, in Claim 3, delete "melt spinning" and insert -- method --.

Column 27  
Line 18, in Claim 7, delete "claim 1" and insert -- claim 5 --.  
Lines 18-19, in Claim 7, delete "melt spinning" and insert -- method --.

Column 28  
Line 17, in Claim 12, delete "$V_2O$," and insert -- $V_2O_5$, --.

Column 30  
Line 2, in Claim 18, delete "$AL_2O_3$," and insert -- $Al_2O_3$, --.  
Line 6, in Claim 18, delete "$_{GeO2}$," and insert -- $GeO_2$, --.

Signed and Sealed this  
Twenty-eighth Day of August, 2012

David J. Kappos  
*Director of the United States Patent and Trademark Office*